(12) United States Patent
Huang et al.

(10) Patent No.: US 12,738,029 B2
(45) Date of Patent: Sep. 15, 2026

(54) METHOD AND A SERVER FOR GENERATING TRAINING DATA FOR TRAINING AN OBJECT DETECTOR

(71) Applicants: Huawei Technologies Canada Co., Ltd., Kanata (CA); Chengjie Huang, Kitchener (CA); Vahdat Abdelzad, Waterloo (CA); Sean Albert Sedwards, Kitchener (CA); Krzysztof Czarnecki, Waterloo (CA)

(72) Inventors: Chengjie Huang, Kitchener (CA); Vahdat Abdelzad, Waterloo (CA); Sean Albert Sedwards, Kitchener (CA); Krzysztof Czarnecki, Waterloo (CA); Eduardo R. Corral-Soto, Toronto (CA)

(73) Assignee: Huawei Technologies Canada Co., Ltd., Kanata (CA)

( * ) Notice: Subject to any disclaimer, the term of this patent is extended or adjusted under 35 U.S.C. 154(b) by 607 days.

(21) Appl. No.: 18/337,496

(22) Filed: Jun. 20, 2023

(65) Prior Publication Data

US 2024/0428566 A1 Dec. 26, 2024

(51) Int. Cl.
*G06V 10/774* (2022.01)
*G06V 10/762* (2022.01)
*G06V 20/70* (2022.01)

(52) U.S. Cl.
CPC .......... *G06V 10/774* (2022.01); *G06V 10/762* (2022.01); *G06V 20/70* (2022.01)

(58) Field of Classification Search
CPC .... G06V 10/255; G06V 10/62; G06V 10/762; G06V 10/774; G06V 10/82; G06V 20/58; G06V 20/64; G06V 20/70
See application file for complete search history.

(56) References Cited

FOREIGN PATENT DOCUMENTS

WO WO-2022076655 A1 * 4/2022 ......... G06F 18/2148

OTHER PUBLICATIONS

Lang et al., "PointPillars: Fast encoders for object detection from point clouds", Proceedings of the IEEE/CVF conference on computer vision and pattern recognition, 2019, pp. 12697-12705.
Shi et al., "PointRCNN: 3D object proposal generation and detection from point cloud", Proceedings of the IEEE/CVF conference on computer vision and pattern recognition, 2019, pp. 770-779.

(Continued)

*Primary Examiner* — Michael J Vanchy, Jr.
(74) *Attorney, Agent, or Firm* — BCF LLP

(57) ABSTRACT

A system and method for generating training data for fine-tuning an Object Detector (OD) are provided. The method comprises: receiving a given sequence of labelled 3D point clouds of the source domain; selecting, in the sequence bounding boxes, a quasi-stationary bounding box that is a most overlapped bounding box by other bounding boxes from the sequence of bounding boxes; generating a re-labelled 3D point cloud of the source domain by relocating, in the given labelled 3D point cloud, the respective bounding box of the training object to a location thereof corresponding to a location of the quasi-stationary bounding box in an other labelled 3D point cloud; and storing the re-labelled 3D point cloud of the source domain in an internal memory of the server.

18 Claims, 9 Drawing Sheets

(56) References Cited

OTHER PUBLICATIONS

Shi et al., "PV-RCNN: Point-voxel feature set abstraction for 3d object detection", Proceedings of the IEEE/CVF Conference on Computer Vision and Pattern Recognition, 2020, pp. 10529-10538.
Yan et al., "Second: Sparsely embedded convolutional detection", Sensors, Oct. 6, 2018, 18, 3337, pp. 1-17.
Yin et al., "Center-based 3d object detection and tracking", Proceedings of the IEEE/CVF conference on computer vision and pattern recognition, 2021, pp. 11784-11793.
Geiger et al., "Vision meets robotics: The kitti dataset", The International Journal of Robotics Research, 32.11 (2013): 1231-1237.
Caesar et al., "nuScenes: A multimodal dataset for autonomous driving", Proceedings of the IEEE/CVF conference on computer vision and pattern recognition, 2020, pp. 11621-11631.
Sun et al., "Scalability in perception for autonomous driving: Waymo open dataset", Proceedings of the IEEE/CVF conference on computer vision and pattern recognition, 2020, pp. 2446-2454.
Chang et al., "Argoverse: 3d tracking and forecasting with rich maps", Proceedings of the IEEE/CVF conference on computer vision and pattern recognition, 2019, pp. 8748-8757.
Wilson et al., "Argoverse 2: Next generation datasets for self-driving perception and forecasting", arXiv preprint arXiv:2301.00493 (2023), pp. 1-27.
Mao et al., "One million scenes for autonomous driving: Once dataset", arXiv preprint arXiv:2106.11037, (2021), pp. 1-21.
Bijelic et al., "Seeing through fog without seeing fog: Deep multimodal sensor fusion in unseen adverse weather", Proceedings of the IEEE/CVF Conference on Computer Vision and Pattern Recognition, 2020, pp. 11682-11692.
Pitropov et al., "Canadian adverse driving conditions dataset", The International Journal of Robotics Research, vol. 40(4-5), 2021, pp. 681-690.
Wang et al., "Train in Germany, test in the USA: Making 3D object detectors generalize" Proceedings of the IEEE/CVF Conference on Computer Vision and Pattern Recognition, 2020, pp. 11713-11723.
Yang et al., "ST3D: Self-training for unsupervised domain adaptation on 3D object detection", Proceedings of the IEEE/CVF conference on computer vision and pattern recognition, 2021, pp. 10368-10378.
Yang et al., "ST3D++: Denoised self-training for unsupervised domain adaptation on 3D object detection", IEEE Transactions on Pattern Analysis and Machine Intelligence (2022), pp. 6354-6371.
Zeng et al., "Learning transferable features for point cloud detection via 3D contrastive co-training", Advances in Neural Information Processing Systems, 34, (2021), pp. 21493-21504.
Zhang et al., "SRDAN: Scale-aware and range-aware domain adaptation network for cross-dataset 3D object detection", Proceedings of the IEEE/CVF Conference on Computer Vision and Pattern Recognition, 2021, pp. 6769-6779.
Luo et al., "Unsupervised domain adaptive 3D detection with multi-level consistency" Proceedings of the IEEE/CVF International Conference on Computer Vision, 2021, pp. 8866-8875.
Barrera et al., "Cycle and semantic consistent adversarial domain adaptation for reducing simulation-to-real domain shift in lidar bird's eye view", 2021 IEEE International Intelligent Transportation Systems Conference (ITSC), IEEE, Sep. 19-21, 2021, pp. 3081-3086.
Xu et al., "SPG: Unsupervised domain adaptation for 3D object detection via semantic point generation", Proceedings of the IEEE/CVF International Conference on Computer Vision, 2021, pp. 15446-15456.
Corral-Soto et al., "Lidar few-shot domain adaptation via integrated cyclegan and 3D object detector with joint learning delay", 2021 IEEE International Conference on Robotics and Automation (ICRA), IEEE, May 31-Jun. 4, 2021, pp. 13099-13105.
Tsai et al., "See Eye to Eye: A Lidar-Agnostic 3D Detection Framework for Unsupervised Multi-Target Domain Adaptation", IEEE Robotics and Automation Letters, vol. 7, No. 3, Jul. 3, 2022, pp. 7904-7911.
Tsai et al., "Viewer-Centred Surface Completion for Unsupervised Domain Adaptation in 3D Object Detection", arXiv preprint arXiv:2209.06407, (2022).
digtalcommons.mtu.edu, Winter Adverse Driving Dataset, retireved from https://digitalcommons.mtu.edu/wads/ on Jun. 1, 2023.
Caine et al., "Pseudo-labeling for scalable 3D object detection", arXiv preprint arXiv:2103.02093, 2021, pp. 1-16.
You et al., "Exploiting Playbacks in Unsupervised Domain Adaptation for 3D Object Detection in Self-Driving Cars", 2022 International Conference on Robotics and Automation (ICRA), IEEE, May 23-27, 2022, pp. 5070-5077.
Walsh et al., "Leveraging Temporal Data for Automatic Labelling of Static Vehicles", 2020 17th Conference on Computer and Robot Vision (CRV), IEEE, 2020, pp. 134-141.
Yang et al., "Auto4D: Learning to label 4D objects from sequential point clouds", arXiv preprint arXiv:2101.06586, (2021).
Qi et al., "Offboard 3D object detection from point cloud sequences" Proceedings of the IEEE/CVF Conference on Computer Vision and Pattern Recognition, 2021, pp. 6134-6144.
Arora et al., "Static map generation from 3D LiDAR point clouds exploiting ground segmentation", Robotics and Autonomous Systems 159, (2023): 104287.
Hornung et al., "OctoMap: An efficient probabilistic 3D mapping framework based on octrees", Autonomous robots 34, (2013), pp. 189-206.
Lee et al., "Patchwork++: Fast and Robust Ground Segmentation Solving Partial Under-Segmentation Using 3D Point Cloud", 2022 IEEE/RSJ International Conference on Intelligent Robots and Systems (IROS), IEEE, Oct. 23-27, 2022, pp. 13276-13283.
Fruhwirth-Reisinger et al., "Fast3D: Flow-aware self-training for 3d object detectors", BMVC, 2021, pp. 1-14.
Wang et al., "Sparse2Dense: Learning to Densify 3D Features for 3D Object Detection", 36th Conference on NeurIPS, 2022, pp. 1-17.
Manivasagam et al., "LiDARsim: Realistic lidar simulation by leveraging the real world", CVPR, 2020, pp. 11167-11179.
Zhou et al., "Objects as points", arXiv:1904.07850v2, Apr. 25, 2019.

* cited by examiner

METHOD AND A SERVER FOR GENERATING TRAINING DATA FOR TRAINING AN OBJECT DETECTOR

FIELD

The present technology relates broadly to object detection; and more specifically, to a method and server for generating training data for training an object detection model for detecting objects.

BACKGROUND

Optimizing a given object detection model for detecting objects based on data of multiple domains (such as that generated in different geographical locations or in different weather conditions) can be costly and lack scalability. For example, such optimization may require comparatively large training datasets from each domain that have been labelled by human assessors, which can be expensive and inefficient.

Thus, it is desired to train a cross-domain object detection model reducing the involvement of the human assessors in the preparation of the training datasets.

Certain prior art approaches directed to generating pseudo-labels (that is, automatically generated labels) have been proposed to address the above-identified technical problem.

An article entitled "*ST3D: SELF-TRAINING FOR UNSUPERVISED DOMAIN ADAPTATION ON 3D OBJECT DETECTION*," authored by Yang et al., and published proceedings of the *IEEE/CVF Conference on Computer Vision and Pattern Recognition* held in June 2021, discloses an Unsupervised Domain Adaptation (UDA) approach that applies a standard self-training paradigm to 3D object detection and introduces techniques to improve pseudo-label quality.

An article entitled "*ST3D++: DENOISED SELF-TRAINING FOR UNSUPERVISED DOMAIN ADAPTATION ON 3D OBJECT DETECTION*," authored by Yang et al., and published in the journal *IEEE Transactions on Pattern Analysis and Machine Intelligence* on Aug. 15, 2021, is directed to reducing noise in pseudo-label generation as well as alleviating the negative impacts of noisy pseudo-labels on model training. First, ST3D++ pre-trains the 3D object detector on the labeled source domain with random object scaling (ROS) which is designed to reduce target domain pseudo-label noise arising from object scale bias of the source domain. Then, the detector is progressively improved through alternating between generating pseudo-labels and training the object detector with pseudo-labeled target domain data.

An article entitled "*EXPLOITING PLAYBACKS IN UNSUPERVISED DOMAIN ADAPTATION FOR 3D OBJECT DETECTION IN SELF-DRIVING CARS*," authored by Yurong et al., and published in the proceedings of *International Conference on Robotics and Automation* (*ICRA*) held in May 2022, discloses fine-tuning an object detector on high-quality pseudo-labels in the target domain-pseudo-labels that are automatically generated after driving based on replays of previously recorded driving sequences. In these replays, object tracks are smoothed forward and backward in time, and detections are interpolated and extrapolated leveraging future information to catch challenging cases such as missed detections due to occlusions or far ranges.

An article entitled "*LEVERAGING TEMPORAL DATA FOR AUTOMATIC LABELLING OF STATIC VEHICLES*," authored by Walsh et al., and published in the proceedings of 17*th Conference on Computer and Robot Vision* (*CRV*) held in May 2020, discloses an approach allowing easing the workload of annotators by automatically proposing high-recall labels for static vehicles. The paper further discloses using an object detection network pre-trained on an existing dataset to propose detections within a sequence. By determining the location of each frame in a common reference frame, all detections of a static vehicle will share the same location. By averaging these overlapping detections and extending the prediction to all reasonable frames, identical labels for the same object throughout the sequence can be generated.

An article entitled "*AUTO4D: LEARNING TO LABEL 4D OBJECTS FROM SEQUENTIAL POINT CLOUDS*," authored by Yang et al., and published on arxiv.org on Jan. 17, 2021, discloses an automatic annotation pipeline that generates accurate object trajectories in 3D space (i.e., 4D labels) from LiDAR point clouds. More specifically, the paper discloses decomposing the 4D object label into two parts: the object size in 3D that's fixed through time for rigid objects, and the motion path describing the evolution of the object's pose through time. Instead of generating a series of labels in one shot, the paper discloses adopting an iterative refinement process where online generated object detections are tracked through time as the initialization. Thus, by re-estimating the object size and smoothing the motion path, higher quality 4D labels can be generated.

An article entitled "*OFFBOARD 3D OBJECT DETECTION FROM POINT CLOUD SEQUENCES*," authored by Qi et al., and published on proceedings of the *IEEE/CVF Conference on Computer Vision and Pattern Recognition* held in June 2021, discloses an offboard 3D object detection pipeline using point cloud sequence data. More specifically, the paper discloses designing an offboard detector that can make use of the temporal points through both multi-frame object detection and novel object-centric refinement models. Evaluated on the Waymo Open Dataset, the disclosed pipeline named 3D Auto Labeling shows significant gains compared to the state-of-the-art onboard detectors and our offboard baselines.

SUMMARY

It is an object of the present technology to ameliorate at least one inconvenience associated with the prior art.

Embodiments of the present technology have been developed based on developers' appreciation of shortcomings associated with the prior art. Certain non-limiting embodiments of the present technology are directed to an unsupervised domain adaptation pipeline for generating more accurate pseudo-labels to be assigned to training 3D point clouds for training Object Detectors (ODs) to detect objects in multiple domains. In some non-limiting embodiments of the present technology, the OD can be a three-dimensional (3D) OD for processing 3D input data.

The present technology relates broadly to object detection; and more specifically, to a method and server for generating pseudo-labels training data for a target dataset that is not labeled, using a fully-labeled source data set. In some non-limiting embodiments of the present technology, the training data can be LIDAR training data.

More specifically, developers of the present technology have realized that accuracy of pseudo-labels can be increased if they are generated, instead of sparse 3D point clouds, based on aggregated 3D point clouds as they are affected to a lesser degree by the domain gap created, for example, by different configurations of the imaging sensors. To that end, in at least some non-limiting embodiments of the present technology, Simple Aggregation (SA) algorithm can be applied to single-frame 3D point clouds to generate dense 3D point clouds ensuring that there is consistent mapping therebetween, thus allowing the pseudo-labels generated in the dense 3D point clouds to be used in applications involving the single-frame 3D point clouds.

Further, for generating more stable and consistent pseudo-labels, the present methods and systems are directed to identifying, in the dense 3D point clouds, so-called "quasi-stationary" objects, that is, those slow-moving scene objects with 3D structure that is not significantly distorted during the aggregation process due to motion in the dense 3D point clouds.

Also, in at least some non-limiting embodiments of the present technology, the pseudo-labels can be refined via Spatial Consistency Post-processing (SCP) including applying spatial transformations for determining the positions of the pseudo-labels in a common (global) coordinate system. Unlike the prior art approaches mentioned above, the SCP does not involve using any neural network, which may hence help avoid the potential nested domain adaptation problem.

More specifically, in accordance with a first broad aspect of the present technology, there is provided a computer-implementable method of generating training data for fine-tuning an Object Detector (OD) to detect objects in 3D point clouds in a target domain. The OD has been trained to detect the objects in a source domain, different from the target domain. The method comprises: receiving a given sequence of labelled 3D point clouds of the source domain, the given sequence of labelled 3D point clouds being representative of a respective scene including a training object, each labelled 3D point cloud of the given sequence of labelled 3D point clouds having been labelled with a corresponding label including a respective bounding box indicative of a location of the training object within a given labelled 3D point cloud, thereby defining a sequence of bounding boxes locating the training object in the given sequence of the labelled 3D point clouds; selecting, in the sequence bounding boxes, a quasi-stationary bounding box that is a most overlapped bounding box by other bounding boxes from the sequence of bounding boxes; generating a re-labelled 3D point cloud of the source domain by relocating, in the given labelled 3D point cloud, the respective bounding box of the training object to a location thereof corresponding to a location of the quasi-stationary bounding box in an other labelled 3D point cloud; and storing the re-labelled 3D point cloud of the source domain in an internal memory of the server.

In some implementations of the method, the selecting comprises selecting the quasi-stationary bounding box that is the most overlapped by other bounding boxes from the sequence of bounding boxes with a number of points above a predetermined threshold.

In some implementations of the method, the method further comprises: generating a sequence of re-labelled 3D point clouds of the source domain by replacing, in each one of the given sequence of labelled 3D point clouds, the respective bounding box with the quasi-stationary bounding box; and storing the sequence of re-labelled 3D point clouds of the source domain in the internal memory of the server.

In some implementations of the method, prior to the selecting the quasi-stationary bounding box, the method further comprises pre-processing the given sequence of labelled 3D point clouds, by: aggregating labelled 3D point clouds within the given sequence of labelled 3D point clouds to generate a dense labelled training 3D point cloud representative of the respective scene; and applying, to the dense labelled training 3D point cloud, a post-processing function configured for at least one of: (i) removing dynamic training objects from the dense labelled training 3D point cloud; (ii) removing a ground in the dense labelled training 3D point cloud; and (iii) voxel-grid downsampling, and removing statistical outliers.

In some implementations of the method, the aggregating comprises applying a simple aggregation algorithm.

In some implementations of the method, the simple aggregation algorithm comprises aggregating the given sequence of labelled 3D point clouds in accordance with equations:

$$SA' = \bigcup_{i=1,2,\ldots,N} \{T_i p_i^j\}_{j=1,2,\ldots,M_i},$$
$$SA = PS(SA'),$$

where:

$$P_i = \{p_i^1, p_i^2, \ldots, p_i^{M_i}\} \subseteq \mathbb{R}^3$$

is a plurality of points defining the given labelled 3D point cloud;

$\{T_i, T_2, \ldots, T_N\} \subseteq SE(3)$ are corresponding pose transformations that transform each labelled 3D point cloud with a respective bounding box to a common coordinate system;

$M_i = |P_i|$; and $PS$ is the post-processing function.

In some implementations of the method, the selecting the quasi-stationary bounding box from the sequence of bounding boxes comprises: determining, for the given bounding box from the sequence of bounding boxes, a respective value of a quasi-stationary score, the respective value of the quasi-stationary score being indicative of an extent of overlap between the given bounding box and the other bounding box; and determining the quasi-stationary bounding box as being the respective bounding box in the sequence of bounding boxes associated with a highest respective value of the quasi-stationary score.

In some implementations of the method, the respective value of the quasi-stationary score is further indicative of a respective number of points in the given bounding box and the other bounding box.

In some implementations of the method, the respective value of the quasi-stationary score is determined in accordance with a formula:

$$QSS(b_i) = \sum_{j=1}^{N} \frac{C(b_j)}{\sum_{k=1}^{N} C(b_k)} IoU(b_i, b_j),$$

where $(b_i, b_j)$ are the given and other bounding boxes of the sequence of bounding boxes, respectively;

$C(b_i)$ is a number of points within the given bounding box $b_i$; and

IoU is a respective Intersection over Union value between the respective bounding boxes $(b_i, b_j)$.

In some implementations of the method, the respective value of the quasi-stationary score is indicative of an observed distance between center points of the given and other bounding boxes.

In some implementations of the method, the respective value of the quasi-stationary score is indicative of an observed movement velocity of the training object in the given and other bounding boxes.

In some implementations of the method, the other bounding box is the respective bounding box which is one of immediately preceding and immediately following the given bounding box in the sequence of bounding boxes.

In some implementations of the method, the other bounding box is any other bounding box in the sequence of bounding boxes that is different from the given bounding box.

In some implementations of the method, the method further comprises training, using the re-labelled 3D point cloud, an other OD to detect the object in the source domain, thereby generating a pseudo-labelling OD.

In some implementations of the method, the method further comprises: aggregating a sequence of re-labelled 3D point clouds representative of the respective scene to generate a dense re-labelled 3D point cloud; and training, using the dense re-labelled 3D point cloud, the other OD to detect the object in the source domain, thereby generating the pseudo-labelling OD.

In some implementations of the method, the other OD is a replica of the OD having been trained to detect the objects on the source domain.

In some implementations of the method, the other OD has a different architecture from that of the OD.

In some implementations of the method, the method further comprises receiving a plurality of unlabelled 3D point clouds of the target domain, each one of the plurality of unlabelled 3D point clouds being devoid of the corresponding label; feeding each one of the plurality of unlabelled 3D point clouds to the pseudo-labelling OD to generate, for each one of the plurality of unlabelled 3D point clouds, a corresponding pseudo-label, thereby generating a plurality of pseudo-labelled 3D point clouds of the target domain; and storing the plurality of pseudo-labelled 3D point clouds in the internal memory of the server.

In some implementations of the method, prior to the feeding, the method further comprises: aggregating sequences of unlabelled 3D point clouds representative of the respective scenes to generate respective dense unlabelled training 3D point clouds representative of the respective scene; and feeding each respective dense unlabelled training 3D point clouds to the pseud-labelling OD.

In some implementations of the method, wherein the method further comprises applying, to each one of the plurality of pseudo-labelled 3D point clouds, a spatial consistency processing algorithm, including: transforming the respective bounding boxes of corresponding pseudo-labels to a common coordinate system; clustering in the common coordinate system, the respective bounding boxes based on an Intersection over Union threshold; filtering each of the cluster the clusters based on a predetermined number of bounding boxes in a given cluster, the filtering including determining, for each cluster having less than the predetermined number of bounding boxes, a respective single bounding box; and applying, to the clustered and filtered respective bounding boxes of the dense pseudo-labelled training 3D point cloud, an inverse transformation to local coordinate systems thereof in respective ones of the plurality of pseudo-labelled 3D point clouds, thereby generating updated corresponding pseudo-labels.

In some implementations of the method, the transforming the respective bounding boxes to the common coordinate system is in accordance with an equation:

$$B_{SA} = \bigcup T_i B_{SA}^i,$$

where $$B_{SA}^i$$

is a given bounding box of a respective one of the plurality of pseudo-labelled 3D point clouds.

In some implementations of the method, the applying, to the clustered and filtered respective bounding boxes, the inverse transformation to local coordinate systems thereof is in accordance with an equation:

$$B_{SCP}^i = T_i^{-1} B_{SCP},$$

where $B_{SCP}$ is a given clustered and filtered respective bounding box;

$$B_{SCP}^i$$

is the respective bounding box of a given updated corresponding label associated with the respective one of the plurality of pseudo-labelled 3D point clouds; and $$T_i^{-1}$$

is a corresponding pose transformation associated with the respective bounding box in the respective one of the plurality of pseudo-labelled 3D point clouds.

In some implementations of the method, prior to the storing the plurality of pseudo-labelled 3D point clouds, the method further comprises: causing the pseudo-labelling OD to generate, for each one of the corresponding pseudo-labels, a respective pseudo-label confidence score indicative of uncertainty of a given corresponding pseudo-label; feeding each one of the plurality of unlabelled 3D point clouds to the OD to generate: a corresponding sparse pseudo-label for each one of the plurality of unlabelled 3D point clouds; and a respective sparse pseudo-label confidence score indicative of accuracy of a given corresponding sparse pseudo-label; and in response to an overlap between the given corresponding pseudo-label and the given corresponding sparse pseudo-label, selecting, for the generating the plurality of pseudo-labelled 3D point clouds, that one of the given corresponding and corresponding sparse pseudo-labels, which is associated with a higher one of the respective pseudo-label and respective sparse pseudo-label confidence scores.

In some implementations of the method, the method further comprises fine-tuning using the plurality of pseudo-labelled 3D point clouds, the OD to detect the objects in the target domain.

In accordance with a second broad aspect of the present technology, there is provided a system for generating training data for fine-tuning an Object Detector (OD) to detect objects in 3D point clouds in a target domain. The OD has been trained to detect the objects in a source domain, different from the target domain. The system comprises: at least one processor, and at least one memory comprising executable instructions that, when executed by the at least one processor, cause the system to: receive a given sequence of labelled 3D point clouds of the source domain, the given sequence of labelled 3D point clouds being representative of a respective scene including a training object, each labelled 3D point cloud of the given sequence of labelled 3D point clouds having been labelled with a corresponding label including a respective bounding box indicative of a location of the training object within a given labelled 3D point cloud, thereby defining a sequence of bounding boxes locating the training object in the given sequence of the labelled 3D point clouds; select, in the sequence bounding boxes, a quasi-stationary bounding box that is a most overlapped bounding box by other bounding boxes from the sequence of bounding boxes; generate a re-labelled 3D point cloud of the source domain by relocating, in the given labelled 3D point cloud, the respective bounding box of the training object to a location thereof corresponding to a location of the quasi-stationary bounding box in an other labelled 3D point cloud; and store the re-labelled 3D point cloud of the source domain in the at least one memory of the system.

In some implementations of the system, the at least one processor causes the system to select the quasi-stationary bounding box that is the most overlapped by other bounding boxes from the sequence of bounding boxes with a number of points that is above a predetermined threshold In some implementations of the system, wherein the at least one processor further causes the system to: generate a sequence of re-labelled 3D point clouds of the source domain by replacing, in each one of the given sequence of labelled 3D point clouds, the respective bounding box with the quasi-stationary bounding box; and store the sequence of re-labelled 3D point clouds of the source domain in the internal memory of the server.

In some implementations of the system, prior to selecting the quasi-stationary bounding box, the at least one processor further causes the system to pre-process the given sequence of labelled 3D point clouds, by: aggregating labelled 3D point clouds within the given sequence of labelled 3D point clouds to generate a dense labelled training 3D point cloud representative of the respective scene; and applying, to the dense labelled training 3D point cloud, a post-processing function configured for at least one of: (i) removing dynamic training objects from the dense labelled training 3D point cloud; (ii) removing a ground in the dense labelled training 3D point cloud; and (iii) voxel-grid downsampling, and removing statistical outliers.

In some implementations of the system, aggregating comprises applying a simple aggregation algorithm.

In some implementations of the system, the simple aggregation algorithm comprises aggregating the given sequence of labelled 3D point clouds in accordance with equations:

$$SA' = \bigcup_{i=1,2,\ldots,N} \{T_i p_i^j\}_{j=1,2,\ldots,M_i},$$

$$SA = PS(SA'),$$

where:

$$P_i = \{p_i^1, p_i^2, \ldots, p_i^{M_i}\} \subseteq \mathbb{R}^3$$

is a plurality of points defining the given labelled 3D point cloud;

$\{T_i, T_2, \ldots, T_N\} \subseteq SE(3)$ are corresponding pose transformations that transform each labelled 3D point cloud with a respective bounding box to a common coordinate system;

$M_i = |P_i|$; and $PS$ is the post-processing function.

In some implementations of the system, to select the quasi-stationary bounding box from the sequence of bounding boxes, the at least one processor causes the system to:

determine, for the given bounding box from the sequence of bounding boxes, a respective value of a quasi-stationary score, the respective value of the quasi-stationary score being indicative of an extent of overlap between the given bounding box and the other bounding box; and determine the quasi-stationary bounding box as being the respective bounding box in the sequence of bounding boxes associated with a highest respective value of the quasi-stationary score.

In some implementations of the system, the respective value of the quasi-stationary score is further indicative of a respective number of points in the given bounding box and the other bounding box.

In some implementations of the system, the respective value of the quasi-stationary score is determined in accordance with a formula:

$$QSS(b_i) = \sum_{j=1}^{N} \frac{C(b_j)}{\sum_{k=1}^{N} C(b_k)} IoU(b_i, b_j),$$

where $(b_i, b_j)$ are the given and other bounding boxes of the sequence of bounding boxes, respectively;

$C(b_i)$ is a number of points within the given bounding box $b_i$; and

IoU is a respective Intersection over Union value between the respective bounding boxes $(b_i, b_j)$.

In some implementations of the system, the respective value of the quasi-stationary score is indicative of an observed distance between center points of the given and other bounding boxes.

In some implementations of the system, the respective value of the quasi-stationary score is indicative of an observed movement velocity of the training object in the given and other bounding boxes.

In some implementations of the system, the other bounding box is the respective bounding box which is one of immediately preceding and immediately following the given bounding box in the sequence of bounding boxes.

In some implementations of the system, the other bounding box is any other bounding box in the sequence of bounding boxes that is different from the given bounding box.

In some implementations of the system, the at least one processor further causes the system to train, using the re-labelled 3D point cloud, an other OD to detect the object in the source domain, thereby generating a pseudo-labelling OD.

In some implementations of the system, prior to training, the at least one processor further causes the system to: aggregate a sequence of re-labelled 3D point clouds representative of the respective scene to generate a dense re-labelled 3D point cloud; and train, using the dense re-labelled 3D point cloud, the other OD to detect the object in the source domain, thereby generating the pseudo-labelling OD.

In some implementations of the system, the other OD is a replica of the OD having been trained to detect the objects on the source domain.

In some implementations of the system, the other OD has a different architecture from that of the OD.

In some implementations of the system, the at least one processor further causes the system to: receive a plurality of unlabelled 3D point clouds of the target domain, each one of the plurality of unlabelled 3D point clouds being devoid of the corresponding label; feed each one of the plurality of unlabelled 3D point clouds to the pseudo-labelling OD to generate, for each one of the plurality of unlabelled 3D point clouds, a corresponding pseudo-label, thereby generating a plurality of pseudo-labelled 3D point clouds of the target domain; and store the plurality of pseudo-labelled 3D point clouds in the at least one memory of the system.

In some implementations of the system, wherein prior to feeding, the at least one processor further causes the system to: aggregate sequences of unlabelled 3D point clouds representative of the respective scenes to generate respective dense unlabelled training 3D point clouds representative of the respective scene; and feed each respective dense unlabelled training 3D point clouds to the pseud-labelling OD.

In some implementations of the system, the at least one processor further causes the system to: apply to each one of the plurality of pseudo-labelled 3D point clouds, a spatial consistency processing algorithm, including: transforming the respective bounding boxes of corresponding pseudo-labels to a common coordinate system; clustering, in the common coordinate system, the respective bounding boxes based on an Intersection over Union threshold; filtering each of the cluster the clusters based on a predetermined number of bounding boxes in a given cluster, the filtering including determining, for each cluster having less than the predetermined number of bounding boxes, a respective single bounding box; and applying, to the clustered and filtered respective bounding boxes of the dense pseudo-labelled training 3D point cloud, an inverse transformation to local coordinate systems thereof in respective ones of the plurality of pseudo-labelled 3D point clouds, thereby generating updated corresponding pseudo-labels.

In some implementations of the system, the at least one processor causes the system to transform the respective bounding boxes to the common coordinate system is in accordance with an equation:

$$B_{SA} = \bigcup T_i B_{SA}^i,$$

where $$B_{SA}^i$$

is a given bounding box of a respective one of the plurality of pseudo-labelled 3D point clouds.

In some implementations of the system, the at least one processor causes the system to apply, to the clustered and filtered respective bounding boxes, the inverse transformation to local coordinate systems thereof is in accordance with an equation:

$$B_{SCP}^i = T_i^{-1} B_{SCP},$$

where $B_{SCP}$ is a given clustered and filtered respective bounding box;

$$B_{SCP}^i$$

is the respective bounding box of a given updated corresponding label associated with the respective one of the plurality of pseudo-labelled 3D point clouds; and $$T_i^{-1}$$

is a corresponding pose transformation associated with the respective bounding box in the respective one of the plurality of pseudo-labelled 3D point clouds.

In some implementations of the system, prior to storing the plurality of pseudo-labelled 3D point clouds, the at least one processor causes the system to: cause the pseudo-labelling OD to generate, for each one of the corresponding pseudo-labels, a respective pseudo-label confidence score indicative of uncertainty of a given corresponding pseudo-label; feed each one of the plurality of unlabelled 3D point clouds to the OD to generate: a corresponding sparse pseudo-label for each one of the plurality of unlabelled 3D point clouds; and a respective sparse pseudo-label confidence score indicative of accuracy of a given corresponding sparse pseudo-label; and in response to an overlap between the given corresponding pseudo-label and the given corresponding sparse pseudo-label, select, for the generating the plurality of pseudo-labelled 3D point clouds, that one of the given corresponding and corresponding sparse pseudo-labels, which is associated with a higher one of the respective pseudo-label and respective sparse pseudo-label confidence scores.

In some implementations of the system, the at least one processor further causes the system to fine-tune, using the plurality of pseudo-labelled 3D point clouds, the OD to detect the objects in the target domain.

In the context of the present specification, a "server" is a computer program that is running on appropriate hardware and is capable of receiving requests (e.g., from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "user device" is any computer hardware that is capable of running software appropriate to the relevant task at hand. Thus, some (non-limiting) examples of user devices include personal computers (desktops, laptops, netbooks, etc.), smartphones, and tablets, as well as network equipment such as routers, switches, and gateways. It should be noted that a device acting as a user device in the present context is not precluded from acting as a server to other user devices. The use of the expression "a user device" does not preclude multiple user devices being used in receiving/sending, carrying out or causing to be carried out any task or request, or the consequences of any task or request, or steps of any method described herein. It is contemplated that the user device and the server can be implemented as a same single entity.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context), firmware, hardware, or a combination thereof, that is both necessary and sufficient to achieve the specific function(s) being referenced.

In the context of the present specification, the expression "computer usable information storage medium" or "computer-readable medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, the expression "data domain" denotes broadly a collection of values that a data element may include in a particular setting. For example, if the data is image data, such as a 2D image or a 3D point cloud, the data domain may refer to a range of values a given pixel of the 2D image or a given point of the 3D point cloud may have, for example, in a given geographical location (such as a street, a district, a city, a country, and the like), in a given weather condition (such as cloudy, rainy, sunny, and the like), or a combination of both. In another example, the data domain may refer to a range of values the given pixel or the given point may have in a respective one of the 2D image and the 3D point cloud having been generated by a particular image sensor. In other words, in the context of the present specification, 3D point clouds generated by different LiDAR sensors are of different data domains.

In the context of the present specification, the expression "quasi-stationary object" refers to a relatively slow-moving object in a given scene within a sequence of 3D point clouds that is comparatively less distorted during the aggregation process of sequence of 3D point clouds than dynamic objects in the given scene due to the effect of object motion in the aggregated 3D point clouds. In some non-limiting embodiments of the present technology, the quasi-stationary object can be an object that has undergone minimum distortion in the aggregated 3D point cloud. Non-limiting examples of the quasi-stationary objects can include a vehicle travelling at a speed that is lower than a predetermined speed threshold, a pedestrian walking relatively slowly, a stationary object, such as a hydrant, a guardrail, a streetlamp, and the like.

In the context of the present specification, the expression "quasi-stationary bounding box" refers to a bounding box having been defined around the quasi-stationary object that is hence most overlapped with other bounding boxes associated with the quasi-stationary object in the given sequence of 3D point clouds. In some non-limiting embodiments of the present technology, the quasi-stationary bounding box is selected as including a number of points therein that is greater than a predetermined threshold number.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

Figure 1:
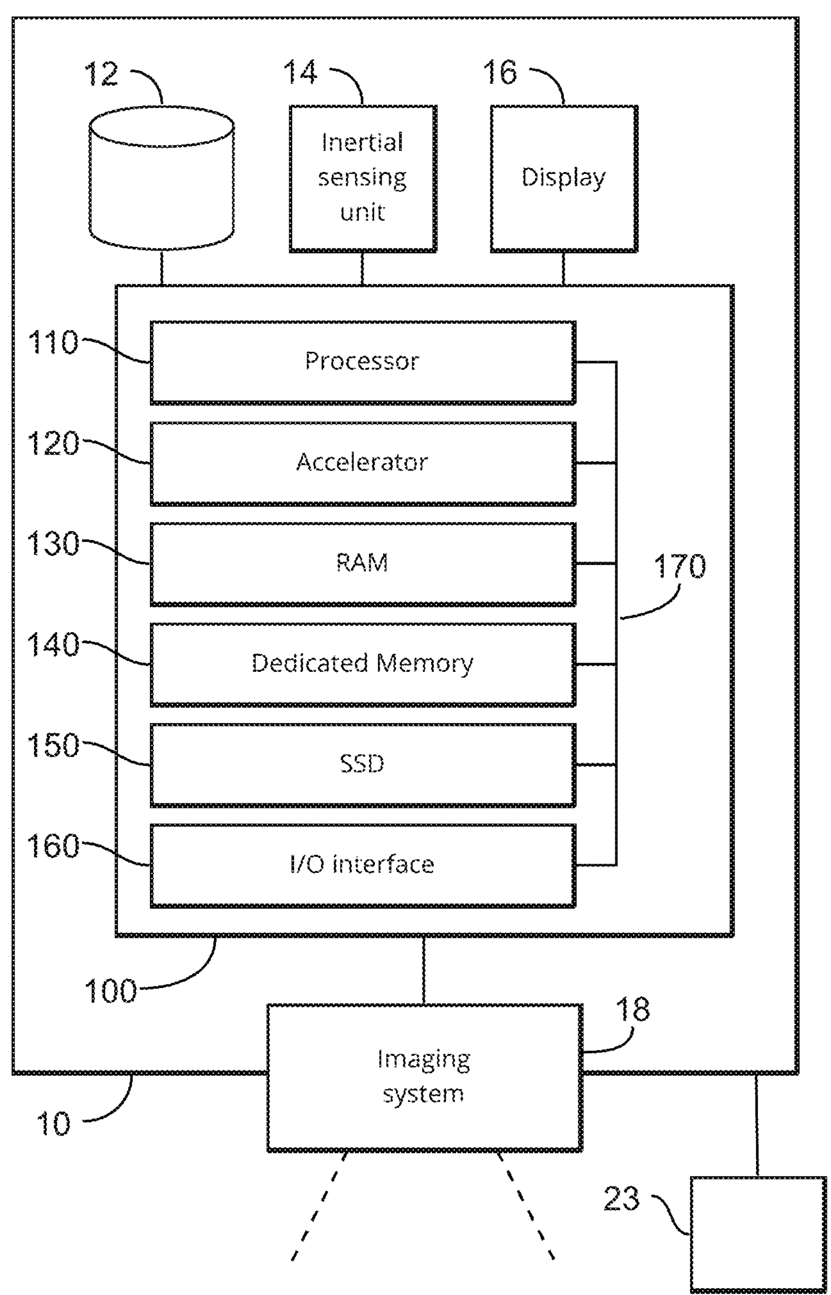
FIG. 1 depicts a schematic diagram of a computer system that can be used for implementing certain non-limiting embodiments of the present technology.

It should also be noted that, unless otherwise explicitly specified herein, the drawings are not to scale.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements that, although not explicitly described or shown herein, nonetheless embody the principles of the present technology.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagram herein represents conceptual views of illustrative circuitry embodying the principles of the present technology. Similarly, it will be appreciated that any flowcharts, flow diagrams, state transition diagrams, pseudo-code, and the like represent various processes that may be substantially represented in non-transitory computer-readable media and so executed by a computer or processor, whether or not such computer or processor is explicitly shown.

The functions of the various elements shown in the figures, including any functional block labelled as a "processor" or "processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general-purpose processor, such as a central processing unit (CPU) or a processor dedicated to a specific purpose, such as a digital signal processor (DSP). Moreover, explicit use of the term a "processor" should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown. Moreover, it should be understood that module may include for example, but without being limitative, computer program logic, computer program instructions, software, stack, firmware, hardware circuitry or a combination thereof which provides the required capabilities.

With these fundamentals in place, we will now consider some non-limiting examples to illustrate various implementations of aspects of the present technology.

Computer System

With reference to FIG. 1, there is depicted a schematic diagram of a computer system 10 configured for generating and/or processing three-dimensional (3D) point clouds in accordance with certain non-limiting embodiments of the present technology. The computer system 10 comprises a computing unit 100 that may receive captured images of an object to be detected. The computing unit 100 may be configured to generate the 3D point cloud as a representation of the object to be detected. The computing unit 100 is described in greater details hereinbelow.

In some non-limiting embodiments of the present technology, the computing unit 100 may be implemented by any of a conventional personal computer, a controller, and/or an electronic device (e.g., a server, a controller unit, a control device, a monitoring device, a personal computer, a laptop, a tablet, etc.) and/or any combination thereof appropriate to the relevant task at hand. In some non-limiting embodiments of the present technology, the computing unit 100 comprises various hardware components including one or more single or multi-core processors collectively represented by a processor 110, a solid-state drive 150, a random access memory (RAM) 130, a dedicated memory 140 and an input/output interface 160. In some non-limiting embodiments of the present technology, the computing unit 100 may be a computer specifically designed to train and/or execute a machine learning algorithm (MLA) and/or deep learning algorithms (DLA). The computing unit 100 may be a generic computer system.

In some other non-limiting embodiments of the present technology, the computing unit 100 may be an "off-the-shelf" generic computer system. In some non-limiting embodiments of the present technology, the computing unit 100 may also be distributed amongst multiple systems (such as electronic devices or servers). The computing unit 100 may also be specifically dedicated to the implementation of the present technology. Other variations as to how the computing unit 100 can be implemented are envisioned without departing from the scope of the present technology.

Communication between the various components of the computing unit 100 may be enabled by one or more internal and/or external buses 170 (e.g. a PCI bus, universal serial bus, IEEE 1394 "Firewire" bus, SCSI bus, Serial-ATA bus, ARINC bus, etc.), to which the various hardware components are electronically coupled.

The input/output interface 160 may provide networking capabilities such as wired or wireless access. As an example, the input/output interface 160 may comprise a networking interface such as, but not limited to, one or more network ports, one or more network sockets, one or more network interface controllers and the like. For example, but without being limitative, the networking interface may implement specific physical layer and data link layer standard such as Ethernet, Fibre Channel, Wi-Fi or Token Ring. The specific physical layer and the data link layer may provide a base for a full network protocol stack, allowing communication among small groups of computers on the same local area network (LAN) and large-scale network communications through routable protocols, such as Internet Protocol (IP).

According to certain non-limiting embodiments of the present technology, the solid-state drive 120 stores program instructions suitable for being loaded into the RAM 130 and executed by the processor 110. Although illustrated as the solid-state drive 150, any type of memory may be used in place of the solid-state drive 150, such as a hard disk, optical disk, and/or removable storage media. According to implementations of the present technology, the solid-state drive 120 stores program instructions suitable for being loaded into the RAM 130 and executed by the processor 110 for executing generation of 3D representation of objects. For example, the program instructions may be part of a library or an application.

The processor 110 may be a general-purpose processor, such as a central processing unit (CPU) or a processor dedicated to a specific purpose, such as a digital signal processor (DSP). In some non-limiting embodiments, the processor 110 may also rely on an accelerator 120 dedicated to certain given tasks, such as executing the methods set forth in the paragraphs below. In some embodiments, the processor 110 or the accelerator 120 may be implemented as one or more field programmable gate arrays (FPGAs). Moreover, explicit use of the term "processor", should not be construed to refer exclusively to hardware capable of executing software, and may implicitly include, without limitation, application specific integrated circuit (ASIC), read-only memory (ROM) for storing software, RAM, and non-volatile storage. Other hardware, conventional and/or custom, may also be included.

Further, in certain non-limiting embodiments of the present technology, the computer system 10 comprises an imaging system 18 that may be configured to capture Red-Green-Blue (RGB) images or a series thereof. The imaging system 18 may comprise camera sensors such as, but not limited to, Charge-Coupled Device (CCD) or Complementary Metal Oxide Semiconductor (CMOS) sensors and/or digital cameras.

Further, according to certain non-limiting embodiments of the present technology, the imaging system 18 may be configured to convert an optical image into an electronic or digital image and may send captured images to the computing unit 100. In some non-limiting embodiments of the present technology, the imaging system 18 may be a single-lens camera providing RGB pictures. In these embodiments, the imaging system 18 can be implemented as a camera of a type available from FLIR INTEGRATED IMAGING SOLUTIONS INC., 12051 Riverside Way, Richmond, BC, V6 W 1K7, Canada. It should be expressly understood that the single-lens camera can be implemented in any other suitable equipment.

Further, in other non-limiting embodiments of the present technology, the imaging system 18 comprises depth sensors configured to acquire RGB-Depth (RGBD) pictures. In yet other non-limiting embodiments of the present technology, the imaging system 18 can include a LiDAR system configured for gathering information about surroundings of the computer system 10 or another system and/or object to which the computer system 10 is coupled. It is expected that a person skilled in the art would understand the functionality of the LiDAR system, but briefly speaking, a light source of the LiDAR system is configured to send out light beams that, after having reflected off one or more surrounding objects in the surroundings of the computer system 10, are scattered back to a receiver of the LiDAR system. The photons that come back to the receiver are collected with a telescope and counted as a function of time. Using the speed of light (~$3\lambda10^{8}$ m/s), the processor 110 of the computing unit 100 of the computer system 10 can then calculate how far the photons have traveled (in the round trip). Photons can be scattered back off of many different entities surrounding the computer system 10.

In a specific non-limiting example, the LiDAR system can be implemented as the LiDAR based sensor that may be of the type available from VELODYNE LIDAR, INC. of 5521 Hellyer Avenue, San Jose, CA 95138, United States of America. It should be expressly understood that the LiDAR system can be implemented in any other suitable equipment.

Other implementations of the imaging system 18 enabling generating 3D point clouds, including, for example, depth sensors, 3D scanners, and other suitable devices are envisioned without departing from the scope of the present technology.

Thus, by using one of the approaches non-exhaustively described above, the imaging system 18 can be configured to generate 3D point clouds representative of surrounding objects of the computer system 10. For example, in those embodiments where the computer system 10 is utilized outdoors, such objects can include, without limitation, particles (aerosols or molecules) of water, dust, or smoke in the atmosphere, moving and stationary surrounding objects of various object classes. In this example, object classes of the moving surrounding objects can include, without limitation, vehicles, trains, cyclists, pedestrians or animals. By contrast, object classes of the stationary objects can include, without limitation, trees, fire hydrants, road posts, streetlamps, traffic lights, and the like.

In another example, where the computer system 10 is utilized indoors, such as in a given room, the surrounding objects can include, without limitation, walls of the given room, furniture articles disposed therein, electric and electronic devices installed or used in the given room (such as home appliances, for example), people, pets, and the like.

In some non-limiting embodiments of the present technology, the imaging system 18 of the computer system 10 can be implemented as an external imaging system (not depicted) configured to: (i) be coupled to the computer system 10 via a respective input/output external interface, such as, a Universal Serial Bus™ (USB) and various configurations thereof, as an example, or any other input/output interface non-exhaustively listed above, as an example; and (ii) transmit captured data to the computing unit 100.

Further, in some non-limiting embodiments of the present technology, the computer system 10 may comprise an Inertial Sensing Unit (ISU) 14 configured to be used in part by the computing unit 100 to determine a position of the imaging system 18 and/or the computer system 10. Therefore, the computing unit 100 may determine a set of coordinates describing the location of the imaging system 18, and thereby the location of the computer system 10, in a coordinate system based on the output of the ISU 14. Generation of the coordinate system is described hereinafter. The ISU 14 may comprise 3-axis accelerometer(s), 3-axis gyroscope(s), and/or magnetometer(s) and may provide velocity, orientation, and/or other position related information to the computing unit 100.

Further, in some non-limiting embodiments of the present technology, the computer system 10 may include a screen or display 16 capable of rendering color 2D and/or 3D images captured by the imaging system 18. In some non-limiting embodiments of the present technology, the display 16 may be used to display live images captured by the imaging system 18, 3D point clouds, Augmented Reality (AR) images, Graphical User Interfaces (GUIs), program output, etc. In some embodiments, display 16 may comprise and/or be housed with a touchscreen to permit users to input data via some combination of virtual keyboards, icons, menus, or other Graphical User Interfaces (GUIs). In some non-limiting embodiments of the present technology, display 16 may be implemented using a Liquid Crystal Display (LCD) display or a Light Emitting Diode (LED) display, such as an Organic LED (OLED) display. In other embodiments, display 16 may be remotely communicatively connected to the computer system 10 via a wired or a wireless connection (not shown), so that outputs of the computing unit 100 may be displayed at a location different from the location of the computer system 10. In this situation, the display 16 may be operationally coupled to, but housed separately from, other functional units and systems in computer system 10. The computer system 10 may be, for example, an iPhone or mobile phone from Apple or a Galaxy mobile phone or tablet from Samsung, or any other mobile device whose features are similar or equivalent to the aforementioned features. The device may be, for example and without being limitative, a handheld computer, a personal digital assistant, a cellular phone, a network device, a camera, a smart phone, an enhanced general packet radio service (EGPRS) mobile phone, a network base station, a media player, a navigation device, an e-mail device, a game console, or a combination of two or more of these data processing devices or other data processing devices.

According to certain non-limiting embodiments of the present technology, the computer system 10 may comprise a memory 12 communicatively connected to the computing unit 100 and configured to store without limitation data, captured images, depth values, sets of coordinates of the computer system 10, 3D point clouds, and raw data provided by ISU 14 and/or the imaging system 18. The memory 12 may be embedded in the computer system 10. The computing unit 100 may be configured to access a content of the memory 12 via a network (not shown) such as a Local Area Network (LAN) and/or a wireless connexion such as a Wireless Local Area Network (WLAN).

The computer system 10 may also include a power system (not depicted) for powering its components. The power system may include a power management system, one or more power sources (e.g., battery, alternating current (AC)), a recharging system, a power failure detection circuit, a power converter or inverter and any other components associated with the generation, management and distribution of power in mobile or non-mobile devices.

As such, in at least some embodiments of the present technology, the computer system 10 may also be suitable for generating the 3D point cloud of a given object directly or based on 2D or 3D images thereof. Such images may have been captured by the imaging system 18, as described in detail above. As an example, the computer system 10 may generate the 3D point cloud according to the teachings of the Patent Cooperation Treaty Patent Publication No. 2020/240497, an entirety of the contents which is hereby incorporated by reference.

Summarily, it is contemplated that the computer system 10 may perform at least some of the operations and steps of methods described in the present disclosure. More specifically, the computer system 10 may be suitable for generating 3D point clouds of various objects (such as those mentioned above) including data points representative thereof. For example, in some non-limiting embodiments of the present technology, the computer system 10 can be part of a control system of an autonomous vehicle (also known as a "self-driving car", not depicted) and generate the 3D point clouds representative of surrounding objects of the autonomous vehicle. In these embodiments, based on the data of the surrounding objects determined via the 3D point clouds, the processor 110 of the computer system 10 can be configured, for example, to generate a trajectory for the autonomous vehicle. In another example, based on the data of the surrounding objects, the processor 110 can be configured to generate (or otherwise validate) a 3D map for navigation of the autonomous vehicle.

Further, according to certain non-limiting embodiments of the present technology, the computer system 10 can be communicatively connected (e.g. via any wired or wireless communication link including, for example, 4G, LTE, Wi-Fi, or any other suitable connection) to a server 23.

In some embodiments of the present technology, the server 23 is implemented as a computer server and could thus include some or all of the components of the computing unit 100 of FIG. 1. In one non-limiting example, the server 23 is implemented as a Dell™ PowerEdge™ Server running the Microsoft™ Windows Server™ operating system, but can also be implemented in any other suitable hardware, software, and/or firmware, or a combination thereof. In some non-limiting embodiments of the present technology, the server 23 can be a single server. In alternative non-limiting embodiments of the present technology, the functionality of the server 23 may be distributed and may be implemented via multiple servers.

The server 23 can be configured to execute some or all of the steps of the present methods. More specifically, according to certain non-limiting embodiments of the present technology, the server 23 can be configured to: (i) acquire, from the computer system 10, a given 3D point cloud; and (ii) based on the given 3D point cloud, detect the objects captured therein.

Figure 2:
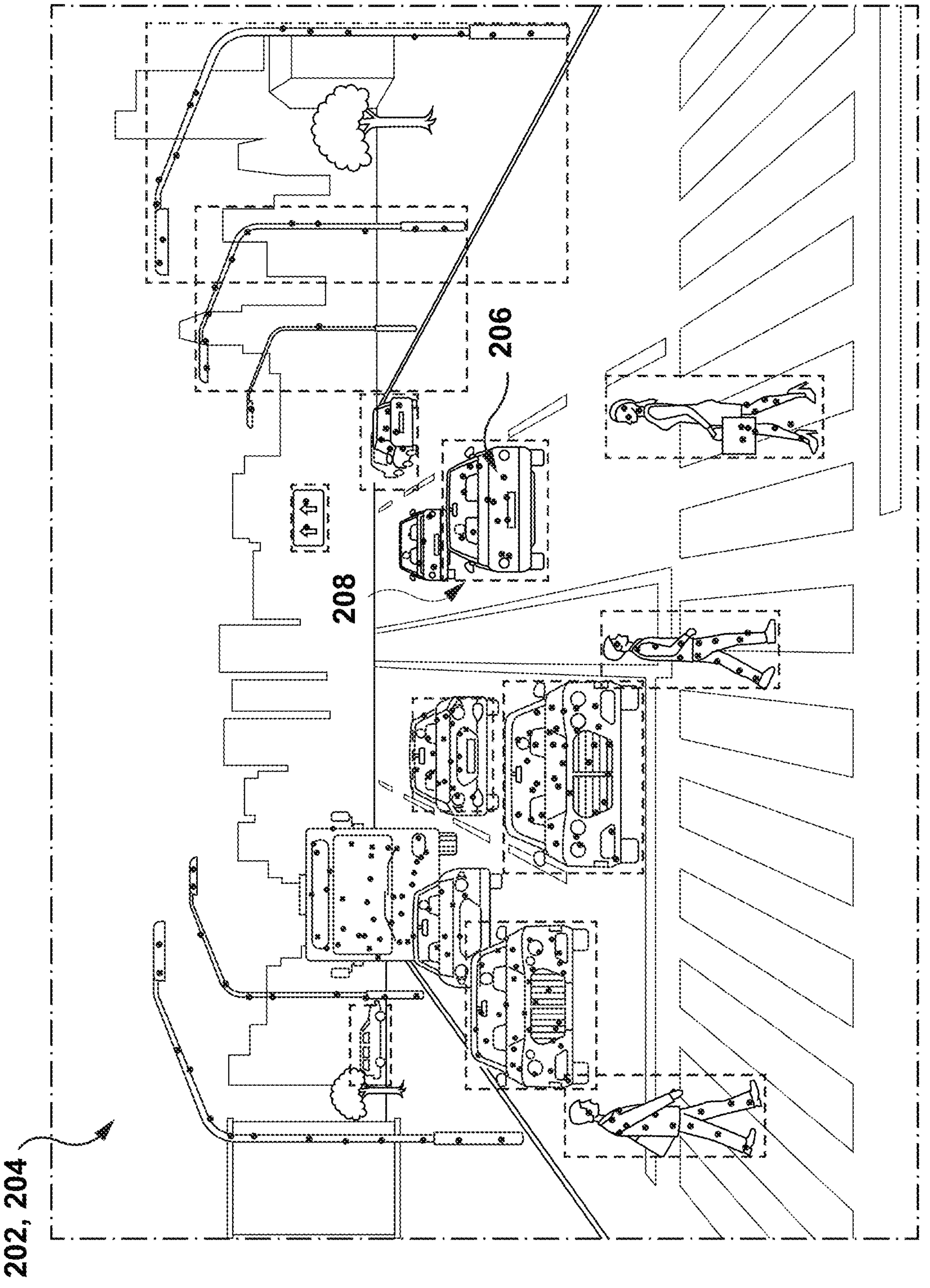
FIG. 2 depicts a schematic diagram of an example representation of objects captured by an imaging system of the computer system of FIG. 1 that are to be detected, in accordance with certain non-limiting embodiments of the present technology.

With reference to FIG. 2, there is depicted a schematic diagram of a representation of a given road section 202 as perceived from a point of view of the imaging device 18 when the computer system 10 is used as part of the control system of the autonomous vehicle, in accordance with certain non-limiting embodiments of the present technology.

As it can be appreciated from FIG. 2, the processor 110 of the computer system 10 can be configured to generate a given 3D point cloud 204 including data points representative of objects in the given road section 202, such as a given surrounding object 206. Generally speaking, a given data point is a point in 3D space indicative of at least a portion of a surface of the given surrounding object 206 in the given road section 202 that has been captured by the imaging system 18 of the computer system 10.

Further, as mentioned above, the server 23 can be configured to receive the given 3D point cloud 204 from the computer system 10 and detect the given surrounding object 206 therein. In other words, the server 23 can be configured: (i) to localize the given surrounding object 206 in a coordinate system associated, for example, with the imaging system 18 or the autonomous vehicle (not depicted); and (ii) determine a respective object class of the given surrounding object 206, that is, a vehicle. More specifically, according to certain non-limiting embodiments of the present technology, the server 23 can be configured to localize the given surrounding object 206 in the given 3D point cloud 204 by generating, around the given surrounding object 206, a respective bounding box 208; and based on features of data points of the given 3D point cloud 204 within the respective bounding box 208, determine the respective object class of the given surrounding object 206.

Figure 3:
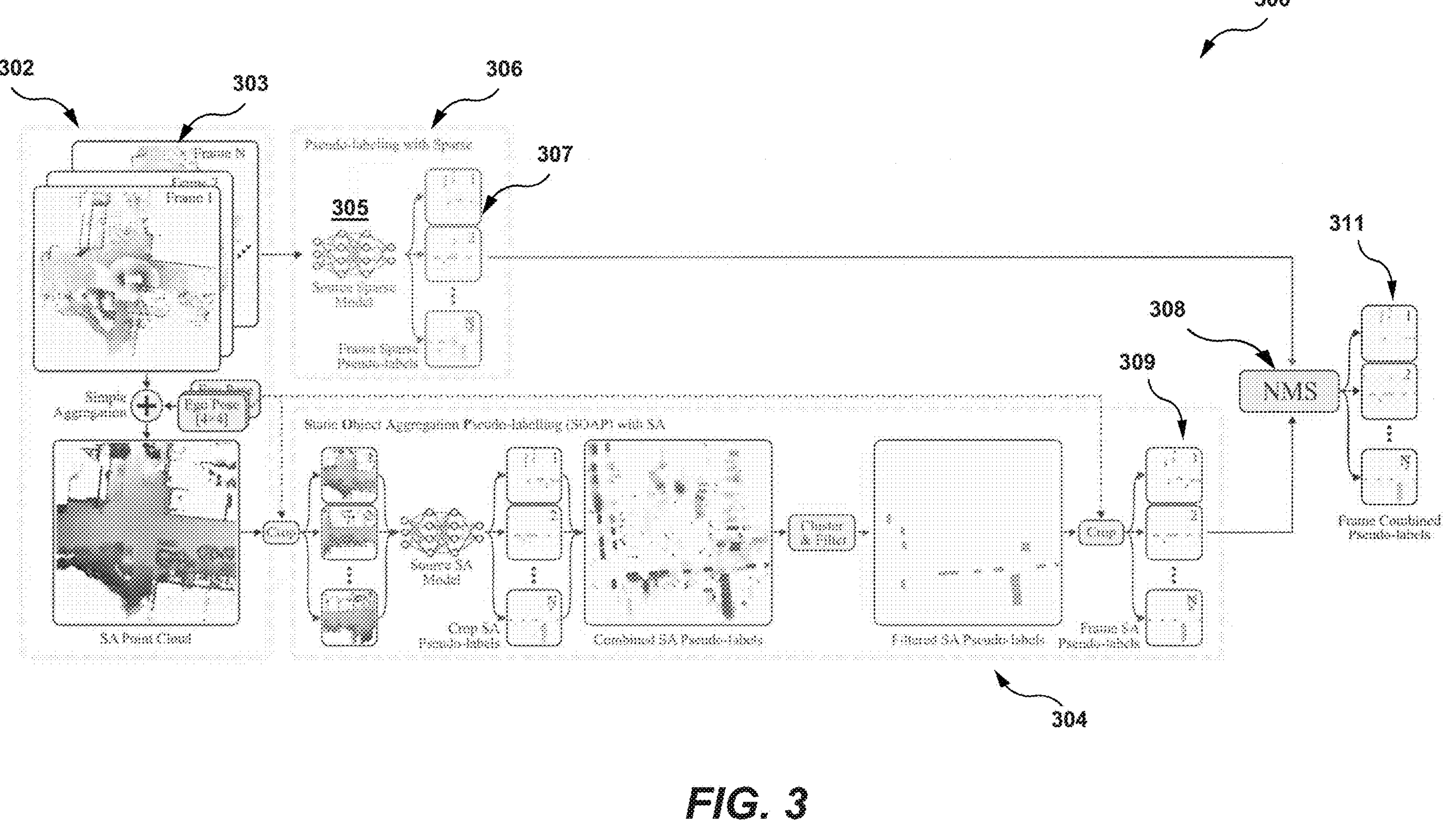
FIG. 3 depicts a schematic diagram of a pseudo-labelling pipeline for generating, by a server of the computer system of FIG. 1, training data for training an Object Detector (OD) to detect the objects of FIG. 2, in accordance with certain non-limiting embodiments of the present technology.

According to certain non-limiting embodiments of the present technology, to detect the given surrounding object 206 in the given 3D point cloud 204, the server 23 can be configured to train and further execute an object detection machine-learning model (also referred to herein as an "object detector" or simply "OD", for short), such as an OD 305 depicted in FIG. 3.

Broadly speaking, according to certain non-limiting embodiments of the present technology, the OD 305 can comprise (i) a feature extractor (not depicted) configured to determine feature maps (or otherwise "feature vectors") including latent features that are representative of the objects captured in the given 3D point cloud 204; and (ii) a detection head (not depicted) configured to identify the objects based on the feature maps generated by the feature extractor. In some non-limiting embodiments of the present technology, the feature extractor can be implemented based on a convolutional neural network configured to determine latent features of the 3D point clouds input therein. Non-limiting examples of an architecture for implementing the feature extractor can include at least one of: Voxel ResNet, Point ResNet, PointNet, and UNet.

In the interim, according to certain non-limiting embodiments of the present technology, the detection head of the OD 305 can include a heatmap head (not depicted) configured to determine centers of the bounding boxes associated with the objects; and a dimension head (also not depicted) configured to determine dimensions of a given bounding box, such as those of the respective bounding box 208, based on which the detection head can be configured to further determine the respective object class of the given surrounding object 206. For example, in those embodiments where the feature extractor is implemented based on the convolutional neural network, the detection head can comprise outer convolutional layers of the convolutional neural network, configured to process the feature maps generated by the feature extractor to detect the objects in the given 3D point cloud 204.

In a specific non-limiting example, the OD 305 can have a first OD architecture based on a CenterPoint-based neural network implemented as described, for example, in an article "*OBJECTS AS POINTS*", authored by Zhou et al., the content of which is incorporated herein by reference in its entirety. However, it should be expressly understood that in other non-limiting embodiments of the present technology the first OD architecture for implementing the OD 305 can include, without limitation, a PointPillars framework, a VoxelNet framework, a Point-Voxel Region-based Convolutional Neural Network (PV-RCNN), and a PillarNet framework, for example.

Generally speaking, to train the OD 305 to detect the objects in the given 3D point cloud 204, the server 23 can be configured to (i) acquire a training dataset including a plurality of labelled training 3D point clouds, each of which has a corresponding label including a bounding box indicative of a respective location and a respective object class of at least one training object captured by a given training 3D point cloud; (ii) feed each one of the plurality of training 3D point clouds to the OD 305; and (iii) optimize a difference between predictions of the OD 305 on each training 3D point cloud and the corresponding label associated therewith, using a backpropagation algorithm, thereby adjusting inner parameters (such as node weights of a neural network) of the OD 305. In some non-limiting embodiments of the present technology, a difference between the predictions of the OD 305 and the corresponding labels can be expressed by a loss function, comprising: (i) a regression loss function for training the OD 305 to localize the objects within the given 3D point cloud 204; and (ii) a classification loss function for training the OD 305 to determining the object classes of the objects.

Conventionally, the labelled training dataset can be generated based on raw unlabelled training dataset (such as an unlabelled training dataset 303 depicted in FIG. 3) including a plurality of unlabelled training 3D point clouds, each one of which, unlike the plurality of labelled training 3D point clouds, is devoid of corresponding labels. To generate the labelled training dataset from the unlabelled training dataset 303, the server 23 can be configured to transmit the plurality of unlabelled training 3D point clouds for labelling, for example, to a server (not depicted) of an online crowdsourcing platform, such as an Amazon™ Mechanical Turk™ online crowdsourcing platform, and the like, with a respective labelling task. For example, the respective labelling task can comprise to indicate locations of training objects in each one of the plurality of unlabelled training 3D point clouds, such as by a respective bounding box, and determine the respective object class of each training object. In response, the server of the online crowdsourcing platform can be configured to distribute the plurality of unlabelled training 3D point clouds among human assessors along with the respective labelling task. Once each one of the plurality of unlabelled training 3D point clouds has been labelled by the human assessors, the server of the online crowdsourcing platform can be configured to transmit the so labelled plurality of training 3D point clouds back to the server 23 for inclusion in the labelled training dataset.

However, the developers of the present technology have realized that such an approach to training the OD 305 can have certain drawbacks. More specifically, the developers have realized that to train the OD 305 for detecting objects in 3D point clouds of multiple domains (such as those generated in different cities or by different configurations of the imaging system 18, as an example) may require generating, for each of the domains, a separate training dataset of labelled training 3D point clouds, which may be costly and inefficient.

Thus, the non-limiting embodiments of the present technology are directed to generating, for unlabelled training 3D point clouds of various target domains, pseudo-labels (such as pseudo-labels 311 depicted in FIG. 3), that is, those generated automatically, without involving the human assessors, using the OD 305 that has been trained to detect the object in a single (source) domain. More specifically, the methods and systems disclosed herein are directed to a pseudo-labelling pipeline 300, a schematic diagram of which is depicted, in accordance with certain non-limiting embodiments of the present technology, in FIG. 3. According to certain non-limiting embodiments of the present technology, for generating the pseudo-labels 311, the pseudo-labelling pipeline 300 includes a plurality of procedures, which further include: (i) a Simple Aggregation procedure (SA) 302; (ii) a Static Object Aggregation Pseudo-Labelling (SOAP) procedure 304; (iii) a sparse pseudo-label generating procedure 306; and (iv) a merging procedure 308.

Figure 4:
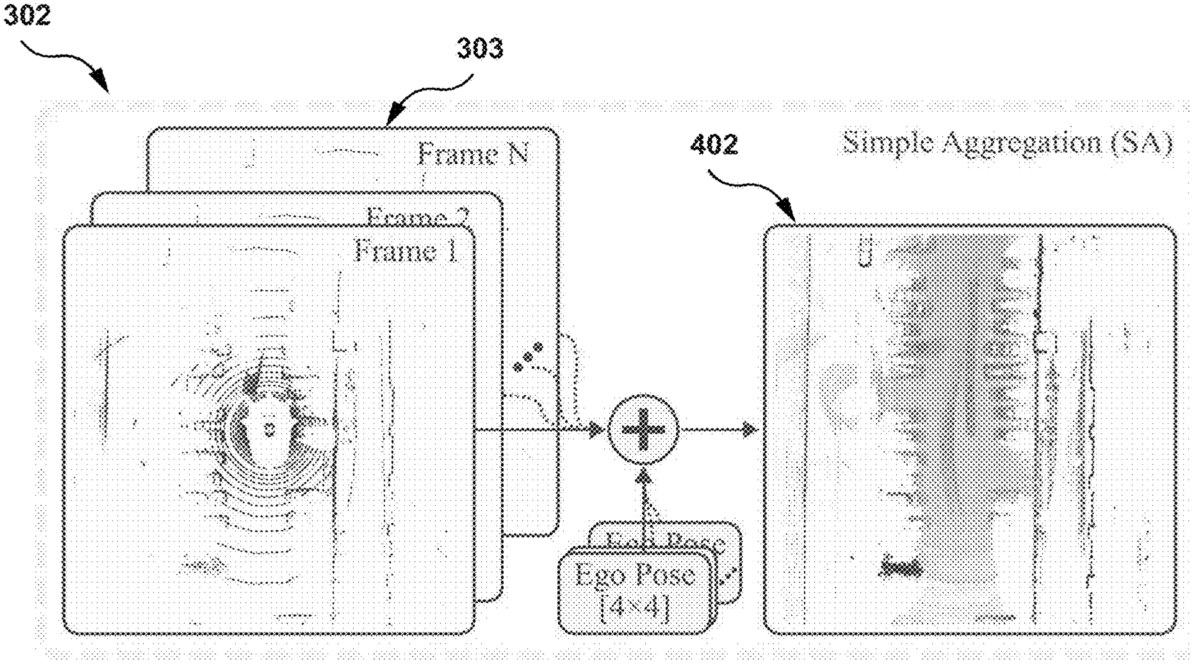
FIG. 4 depicts a schematic diagram of a Simple Aggregation procedure of the pseudo-labelling pipeline of FIG. 3, in accordance with certain non-limiting embodiments of the present technology.

Broadly speaking, according to certain non-limiting embodiments of the present technology, by executing the SA procedure 302, the server 23 can be configured to generate, from sequences of unlabelled training 3D point clouds of the unlabelled training dataset 303 representative of respective training scenes, dense unlabelled training 3D point clouds representative of these scenes, such as a given dense unlabelled training 3D point cloud 402 depicted in FIG. 4. The so generated dense unlabelled training 3D point clouds can further be used for generating the pseudo-labels 311.

Further, according to certain non-limiting embodiments of the present technology, the server 23 can be configured to apply, to the given dense unlabelled training 3D point cloud 402, the SOAP procedure to identify therein so-called "quasi-stationary" training objects, that is, the training objects that have undergone minimum geometrical distortion (such as smudging, for example) after the aggregation of the unlabelled training 3D point clouds. By identifying the quasi-stationary objects, the server 23 can be configured to generate SOAP pseudo-labels 309 for each one of the unlabelled training 3D point clouds.

Further, the server 23 can be configured to execute the sparse pseudo-label generating procedure 306, wherein, using the OD 305 having been trained to detect the objects in a single domain, or otherwise, source domain, the server 23 can be configured to generate sparse pseudo-labels 307 for each one of the unlabelled training 3D point clouds of the unlabelled training data 303.

Finally, the server 23 can be configured to execute the merging procedure 308 to merge the SOAP pseudo-labels 309 generated by the SOAP procedure 304 and the sparse pseudo-labels 307 generated by the sparse pseudo-label generating procedure 306, thereby generating, for each one of the unlabelled 3D point clouds of the unlabelled training dataset 303, a respective pseudo-label of the pseudo-labels 311.

The so generated pseudo-labels 311 can now be used to label the unlabelled training 3D point clouds, thereby producing pseudo-labelled training 3D point clouds that can be used for training or fine-tuning the OD 305 to detect the object in the target domain. Thus, the present methods and systems may allow reducing the use of human-labelled training 3D point clouds for training the OD 305 to detect the object in multiple target domains and increase the overall accuracy of the object detection compared to the prior art approaches.

Now, each one of the SA procedure 302, the SOAP procedure 304, the sparse label generating procedure 306, and the merging procedure 308 will be described in greater detail.

Simple Aggregation Procedure

With reference to FIG. 4, there is depicted a schematic diagram of the SA procedure 302, in accordance with certain non-limiting embodiments of the present technology.

First, according to certain non-limiting embodiments of the present technology, the server 23 can be configured to receive the unlabelled training 3D point clouds of the unlabelled training dataset 303. According to certain non-limiting embodiments of the present technology, it is not limited how the server 23 can be configured to receive the unlabelled training dataset 303. For example, in some non-limiting embodiments of the present technology, each unlabelled training 3D point cloud of the unlabelled training dataset 303 can be generated by the imaging system 18 of the computer system 10, as described above with respect to the given 3D point cloud 204. Further, the computer system 10 can be configured to either store each unlabelled training 3D point cloud of the unlabelled training dataset 303 in one of the RAM 130, dedicated memory 140, and the SSD 150, prior to transmitting the unlabelled training dataset 303 to the server 23; or transmit each unlabelled training 3D point cloud of the unlabelled training dataset 303 to the server 23 directly, without preliminarily storing them.

Further, as mentioned hereinabove, according to certain non-limiting embodiments of the present technology, the unlabelled training dataset 303 can be generated in a target domain, in which the OD 305 is to be trained (or fine-tuned) to detect the objects, which is different from the source domain, in which the OD 305 has already been trained to detect the objects.

More specifically, according to certain non-limiting embodiments of the present technology, a given 3D point cloud of the source domain and a given 3D point cloud of the target domain can be generated given at least one of: (i) different geographical locations; (ii) different weather conditions; and (iii) different configurations of the imaging system 18. According to certain non-limiting embodiments of the present technology, a given geographical location broadly denotes an area of finite dimensions defined either (i) by administrative division in a given country, such as a block of a street, a district, a borough, a city, a region, such as a state or a province, and the like; or (ii) geometrically, such as using a given shape, including, for example, a circle or a square, and the like, of predetermined dimensions, such as 100 m by 100 m, 10 km by 10 km, and the like. Further, according to certain non-limiting embodiments of the present technology, a given weather condition can include at least one of: a sunny weather, a cloudy weather, a rainy weather, a windy weather, a snowy weather, and the like.

Further, a given configuration of the imaging system 18 can be defined by certain values of inherent parameters of the imaging system 18. For example, in those non-limiting embodiments where the imaging system 18 is a LiDAR system, such parameters can include, without limitation, a field of view, a data point density, and a sidelap (that is, a side overlap between two consecutive 3D point clouds) of the LiDAR system. Thus, for example, a given unlabelled training 3D point cloud generated by a LiDAR system configured to emit 32 laser beams is of a different domain from that generated by another LiDAR system configured to stir 64 laser beams to the surrounding area of the computer system 10.

Further, according to certain non-limiting embodiments of the present technology, the server 23 can be configured to: (i) identify, within the unlabelled training 3D point clouds of the target domain, sequences of unlabelled training 3D point clouds representative of the respective training scenes; and (ii) based on each of the sequences, generate a respective aggregated sequence of unlabelled training 3D point clouds, in accordance with a following equation:

$$SA' = \bigcup_{i=1,2,\ldots,N} \{T_i p_i^j\}_{j=1,2,\ldots,M_i}, \quad (1)$$

where:

$$P_i = \{p_i^1, p_i^2, \ldots, p_i^{M_i}\} \subseteq \mathbb{R}^3$$

is a plurality of points defining a given unlabelled training 3D point cloud in a given sequence of unlabelled training 3D point clouds;

$\{T_i, T_2, \ldots, T_N\} \subseteq SE(3)$ are corresponding pose transformations that transform each unlabelled training 3D point cloud from the local coordinate system (such as that associated with the imaging system 18) to a common global coordinate system; and $$M_i = |P_i|.$$

Figure 5A:
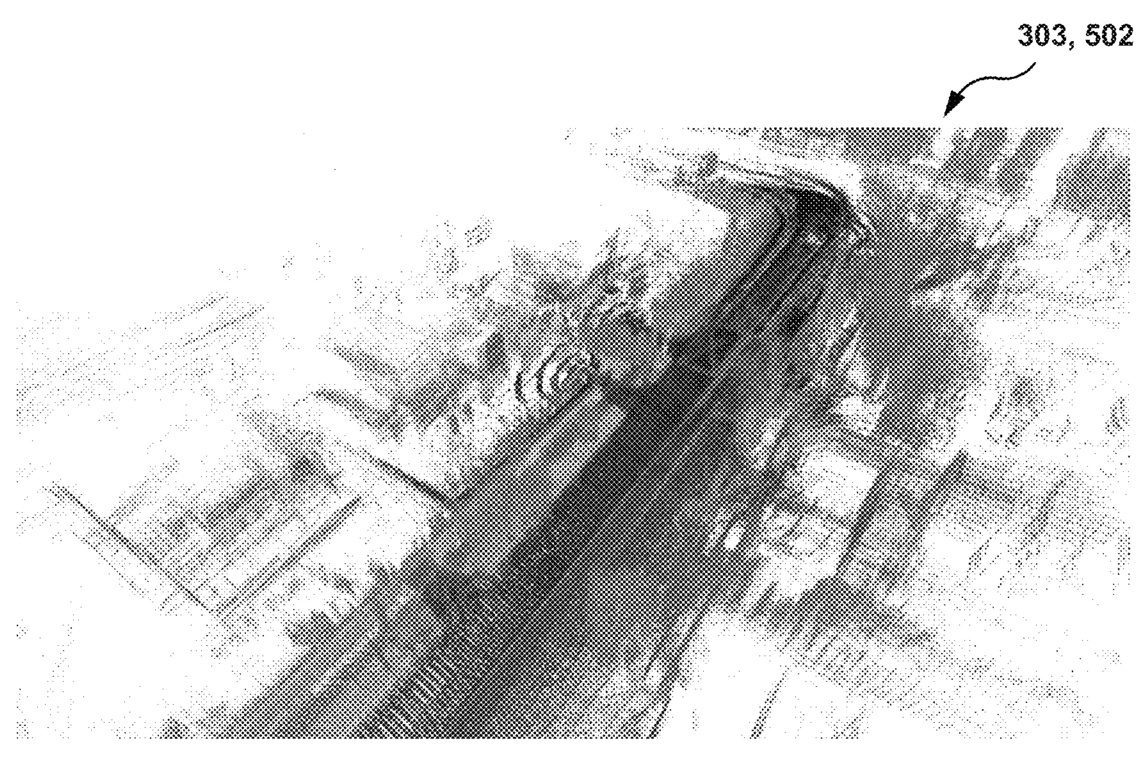
FIGS. 5A and 5B depict an aggregated 3D point cloud, resulted from executing the Simple Aggregation procedure of FIG. 4, before and after applying thereto a post-processing function, in accordance with certain non-limiting embodiments of the present technology.

It is not limited how the server 23 can be configured to define the given sequence of unlabelled training 3D point clouds representative of a respective training scene, and in some non-limiting embodiments of the present technology, can include defining a sequence based on a predetermined period of capturing data of the respective scene. An example of the respective aggregated sequence of unlabelled training 3D point clouds, representative of a training scene 502, generated in accordance with Equation (1) is depicted in FIG. 5A, in accordance with certain non-limiting embodiments of the present technology.

Further, the server 23 can be configured to determine the given dense unlabelled training 3D point cloud 402 representative of the training scene 502 in accordance with a following equation:

$$SA = PS(SA'), \quad (2)$$

where PS is a post-processing function.

According to certain non-limiting embodiments of the present technology, the post-processing function includes at least one of: (i) removing, from the aggregation of the unlabelled training 3D point clouds, dynamic object using, for example, on an OctoMap library; (ii) removing a ground from the aggregation of the unlabelled training 3D point clouds, using, for example, a PatchWork++ algorithm; and (iii) voxel-grid downsampling, and removing statistical outliers.

Figure 5B:
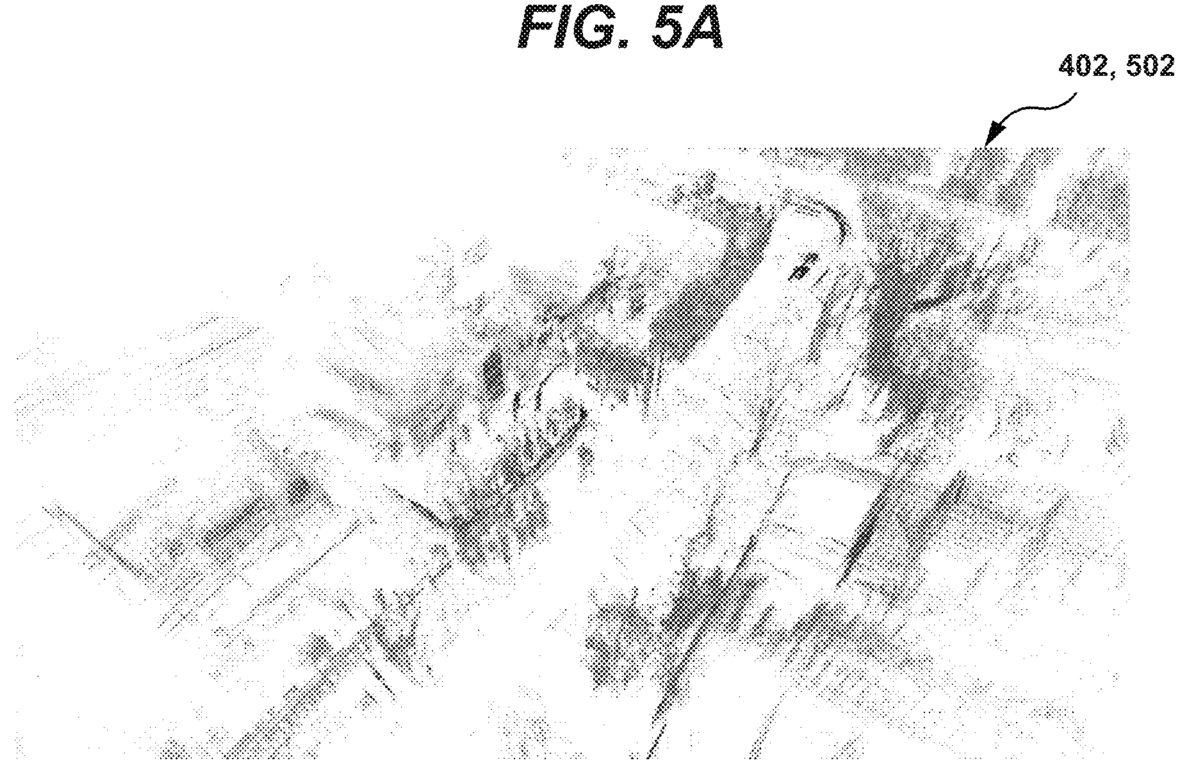

An example of the given dense unlabelled training 3D point cloud 402 representative of the training scene 502 generated by applying the post-processing function to the aggregation of the unlabelled training 3D point clouds is depicted in FIG. 5B, in accordance with certain non-limiting embodiments of the present technology.

Further, as will become apparent from the description provided hereinbelow, in some non-limiting embodiments of the present technology, the server 23 can be configured to apply the SA procedure 302 also to the labelled training 3D point clouds of the source domain, based on which the OD 305 has already been trained to detect the objects in the source domain. More specifically, in these embodiments, similarly, the server 23 can be configured to: (i) identify, within the plurality of labelled training 3D point clouds of the source domain, sequences of labelled training 3D point clouds representative of respective training scenes; and (ii) based on each of the sequences, generated a respective source dense labelled training 3D point cloud (not depicted), as described above with respect to the given dense unlabelled training 3D point cloud 402.

Static Object Aggregation Pseudo-Labelling Procedure

Figure 6:
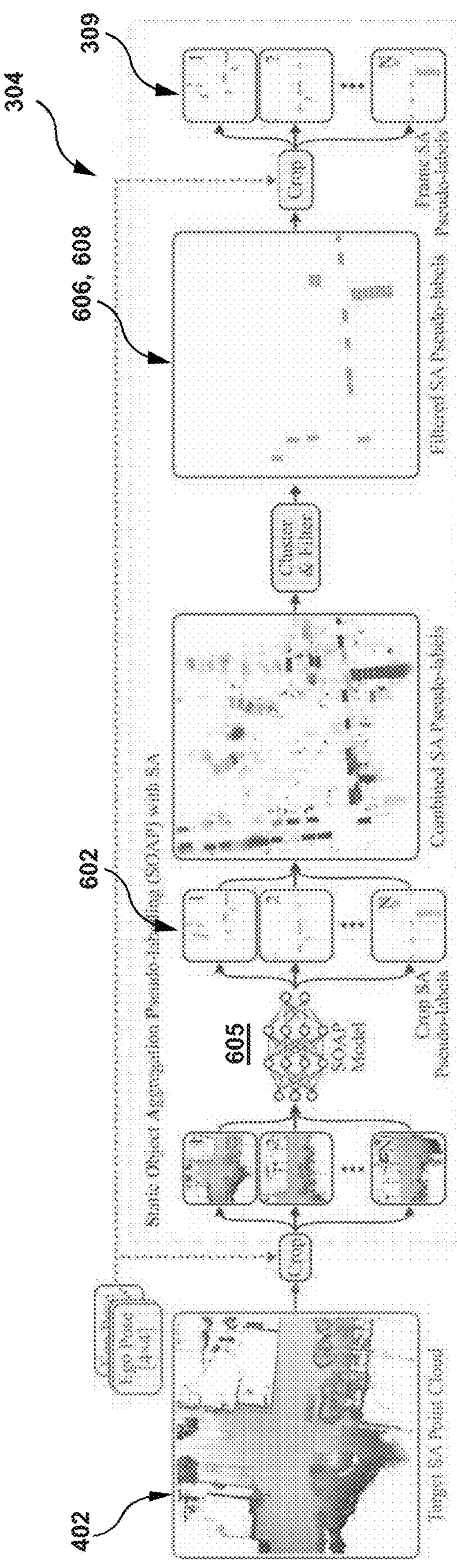
FIG. 6 depicts a schematic diagram of a Static Object Aggregation Pseudo-Labelling procedure of the pseudo-labelling pipeline of FIG. 3, in accordance with certain non-limiting embodiments of the present technology.

With reference to FIG. 6, there is depicted a schematic diagram of the SOAP procedure 304, in accordance with certain non-limiting embodiments of the present technology.

According to certain non-limiting embodiments of the present technology, to generate the SOAP pseudo-labels 309 for each one of the unlabelled training 3D point clouds of the unlabelled training dataset 303, first, the server 23 can be configured to train, based on the plurality of dense labelled training 3D point clouds generated by the SA procedure 302, an other OD to detect the objects in dense 3D point clouds of the source domain. The other OD can be implemented based on a second OD architecture. Similar to the first OD architecture, the second OD architecture can include, without limitation, one of: the CenterPoint convolutional neural network, the PointPillars framework, the VoxelNet framework, the Point-Voxel Region-based Convolutional Neural Network (PV-RCNN), and the PillarNet framework.

In some non-limiting embodiments of the present technology, the second OD architecture can be the same as the first OD architecture of the OD 305, that is, the other OD can be a replica of the OD 305. However, in other non-limiting embodiments of the present technology, the second OD architecture can be different from the first OD architecture.

To do so, in some non-limiting embodiments of the present technology, the server 23 can be configured to determine a location of a bounding box associated with the at least one training object in a given dense labelled training 3D point cloud generated by the SA procedure 302. In other words, in these embodiments, the server 23 can be said to identify, in the given dense labelled training 3D point clouds, the quasi-stationary objects that have undergone minimum distortion after the SA procedure 302.

To that end, in some non-limiting embodiments of the present technology, the server 23 can be configured to: (i) determine, for each training object in a given labelled training 3D point cloud, a respective Quasi-Stationary Score (QSS); and (ii) determine, based on the determined respective QSS score, whether to select a given training object for training; and (iii) in response to selecting the given training object for pseudo-labelling, propagate its corresponding label every labelled training 3D point cloud of an associated dense labelled training 3D point cloud.

According to certain non-limiting embodiments of the present technology, the server 23 can be configured to determine the respective QSS in accordance with a following equation:

$$QSS(b_i) = \sum_{j=1}^{N} \frac{C(b_j)}{\sum_{k=1}^{N} C(b_k)} IoU(b_i, b_j), \quad (3)$$

where ($b_i$, $b_j$) are bounding boxes of the given training object in two labelled training 3D point clouds of the associated dense labelled training 3D point cloud of the source domain;

$C(b_i)$ is a number of points within a bounding box $b_i$; and

IoU is a respective Intersection over Union value between the bounding boxes ($b_i$, $b_j$).

However, in other non-limiting embodiments of the present technology, the server 23 can be configured to determine the QSS score as being an observed (that is, determined based on sensor data, for example, from the imaging system 18) respective distance between centers of the bounding boxes ($b_i$, $b_j$) in the associated dense labelled training 3D point cloud. In yet other non-limiting embodiments of the present technology, the server 23 can be configured to determine the QSS score as being an observed velocity value of the given training object in the associated dense labelled training 3D point cloud. In other non-limiting embodiments of the present technology, the server 23 can be configured to determine the QSS score as being indicative of at least one of: (i) a number of points in the given bounding box $b_i$, (ii) an other number of points in the other bounding box $b_j$. (iii) a number of overlapping points between the given bounding box and the other bounding box ($b_i$, $b_j$), (iv) a number of non-overlapping points between the given bounding box and the other bounding box ($b_i$, $b_j$), and (v) a proportion of the number of overlapping points and the number of non-overlapping points.

In some non-limiting embodiments of the present technology, the other bounding box $b_j$ can be one of a immediately following or immediately preceding bounding box to the given bounding box $b_i$. However, in other non-limiting embodiments of the present technology, the other bounding box $b_j$ can be any other bounding box in the given sequence labelled training 3D point clouds.

Broadly speaking, the respective QSS represents an extent of overlap between two bounding boxes. In other words, the QSS is indicative of how likely the given training object is undistorted in the given labelled training 3D point cloud at the location of $b_i$. For example, if the other bounding box $b_j$ in an other labelled training 3D point cloud has little overlap with $b_i$ (indicating object movement) but contains only a few points, then the associated dense labelled training 3D point cloud is not likely to be distorted by $b_j$. By contrast, if $b_j$ has a large overlap with $b_i$ and contains a large fraction of points, then the given training object is likely to be distorted at the location $b_i$ in the other labelled training 3D point cloud.

Further, the server 23 can be configured to determine, for the given training object, in the associated dense labelled training 3D point cloud: (i) a likely location b* (also referred to herein as "a quasi-stationary bounding box") of the given training object; and (ii) a degree s*of the given training object being free from distortion (also referred to herein as "a corresponding quasi-stationary score"), in accordance with following equations, respectively:

$$b^* = \arg\max_i QSS(b_i) \text{ and} \quad (4)$$

$$s^* = \max_i QSS(b_i), \quad (5)$$

Further, in some non-limiting embodiments of the present technology, the server 23 can be configured to select training objects for training the other OD to detect the objects in the dense 3D point clouds. In some non-limiting embodiments of the present technology, the server 23 can be configured to select the training objects in the dense labelled training 3D point clouds for training if their respective values of $s^*>\delta$. Further, the sever 23 can be configured to propagate the corresponding labels associated with the selected training objects, that is the respective locations of the bounding boxes thereof, to all associated labelled training 3D point clouds using pose transformations. By doing so, the server 23 can be configured to generate, based on the labelled training 3D point clouds of the source domain, a respective plurality of re-labelled training 3D point clouds of the source domain.

Further, based on the so generated respective plurality re-labelled training 3D point clouds of the source domain, the server 23 can be configured to train the other OD to detect the objects in the dense 3D point clouds of the source domain, thereby generating a pseudo-labelling OD 605.

Further, the server 23 can be configured to use the pseudo-labelling OD 605 to generate SA pseudo-labels 602 for each unlabelled training 3D point cloud of the given dense unlabelled training 3D point cloud 402 generated by the SA procedure 302. More specifically, the server 23 can be configured to feed each unlabelled training 3D point cloud forming the given dense unlabelled training 3D point cloud 402 to the pseudo-labelling OD 605, trained as mentioned above, thereby determining a respective one of the SA pseudo-labels 602. By doing so, the server 23 is configured to generate a sequence of SA pseudo-labelled training 3D point clouds.

However, it should be noted that in other non-limiting embodiments of the present technology, the server 23 can be configured generate the SA pseudo-labels 602 by using the pseudo-labelling OD 605 trained to detect the objects in the dense 3D point clouds, as described above, for the unlabelled training 3D point clouds of the target domain prior to applying thereto the SA procedure 302.

Further, with continued reference to FIG. 6, to remove false positive pseudo-labels and recover false negative ones, in accordance with certain non-limiting embodiments of the present technology, the server 23 can be configured to apply, to each one of the SA pseudo-labels 602 Spatial Consistency Post-processing (SCP).

To that end, according to certain non-limiting embodiments of the present technology, the server 23 can be configured to apply, to each one of the sequence of SA pseudo-labelled training 3D point clouds including the SA pseudo-labels 602, the corresponding pose transformations $T_i$ to the global coordinate system, in accordance with a following equation:

$$B_{SA} = \bigcup T_i B_{SA}^i, \tag{6}$$

where $$B_{SA}^i$$

is a given one of the sequence of SA pseudo-labelled training 3D point clouds including a respective one of the SA pseudo-labels 602 determined as described above.

Further, in some non-limiting embodiments of the present technology, the server 23 can be configured to cluster the SA pseudo-labels 602 (that is, bounding boxes) in the global coordinate system, based on an IoU threshold μ. To ensure the pseudo-labels are consistent across multiple training 3D point clouds, in some non-limiting embodiments of the present technology, the server 23 can further be configured to filter the clusters of the SA pseudo-labels 602 based on a number of the bounding boxes in a cluster of a predetermined size, $$|B_{SA}^c| > \eta.$$

For the remaining clusters, the server 23 can be configured to aggregate the bounding boxes in each cluster to obtain a single bounding box per cluster. More specifically, in this regard, the server 23 can be configured to use θ most confident prediction in each cluster and average other attributes, including predicted confidence score, position (x, y, z), and size (w, l, h).

In some non-limiting embodiments of the present technology, to cluster the SA pseudo-labels 602, the server 23 can be configured to apply a greedy clustering algorithm, including identifying, from a given one of the SA pseudo-labels 602 that has ben determined with a highest predicted confidence score, other ones of the SA pseudo-labels 602 having IoU values no less than 0.5. Other clustering algorithms for clustering the luster the SA pseudo-labels 602 are envisioned without departing from the scope of the present technology.

Further, in some non-limiting embodiments of the present technology, the server 23 can be configured to identify and further remove overlapping ones of the SA pseudo-labels 602 in the global coordinate system. To that end, the server 23 can be configured to apply, for example, a Non-Maximum Suppression (NMS) algorithm.

Thus, by doing so, the server 23 can be configured to generate a filtered dense SA pseudo-labelled training 3D point cloud 606 including an aggregated SOAP pseudo-label 608 ($B_{SOAP}$). Finally, to obtain individual ones of the SOAP pseudo-labels 309

$$(B_{SOAP}^i)$$

for each one of a sequence of SOAP pseudo-labelled training 3D point clouds forming the filtered dense SA pseudo-labelled training 3D point cloud 606, in some non-limiting embodiments of the present technology, the server 23 can be configured to apply inverse transformation of the aggregated SOAP pseudo-label 608 to respective local coordinates of each SOAP pseudo-labelled training 3D point cloud, in accordance with a following equation:

$$B_{SOAP}^i = T_i^{-1} B_{SOAP}. \tag{7}$$

In some non-limiting embodiments of the present technology, the server 23 can be configured to determine, for the given one of the unlabelled training 3D point clouds of the target domain, a respective one of the pseudo-labels 311 as being a respective SOAP pseudo-label of the SOAP pseudo-labels 309. However, in other non-limiting embodiments of the present technology, the server 23 can be configured to compare the respective SOAP pseudo-label with a respective sparse pseudo-label of the sparse pseudo-labels 307 determined by the OD 305 via standard inference, as will be described below.

Sparse Pseudo-Label Generating Procedure

Figure 7:
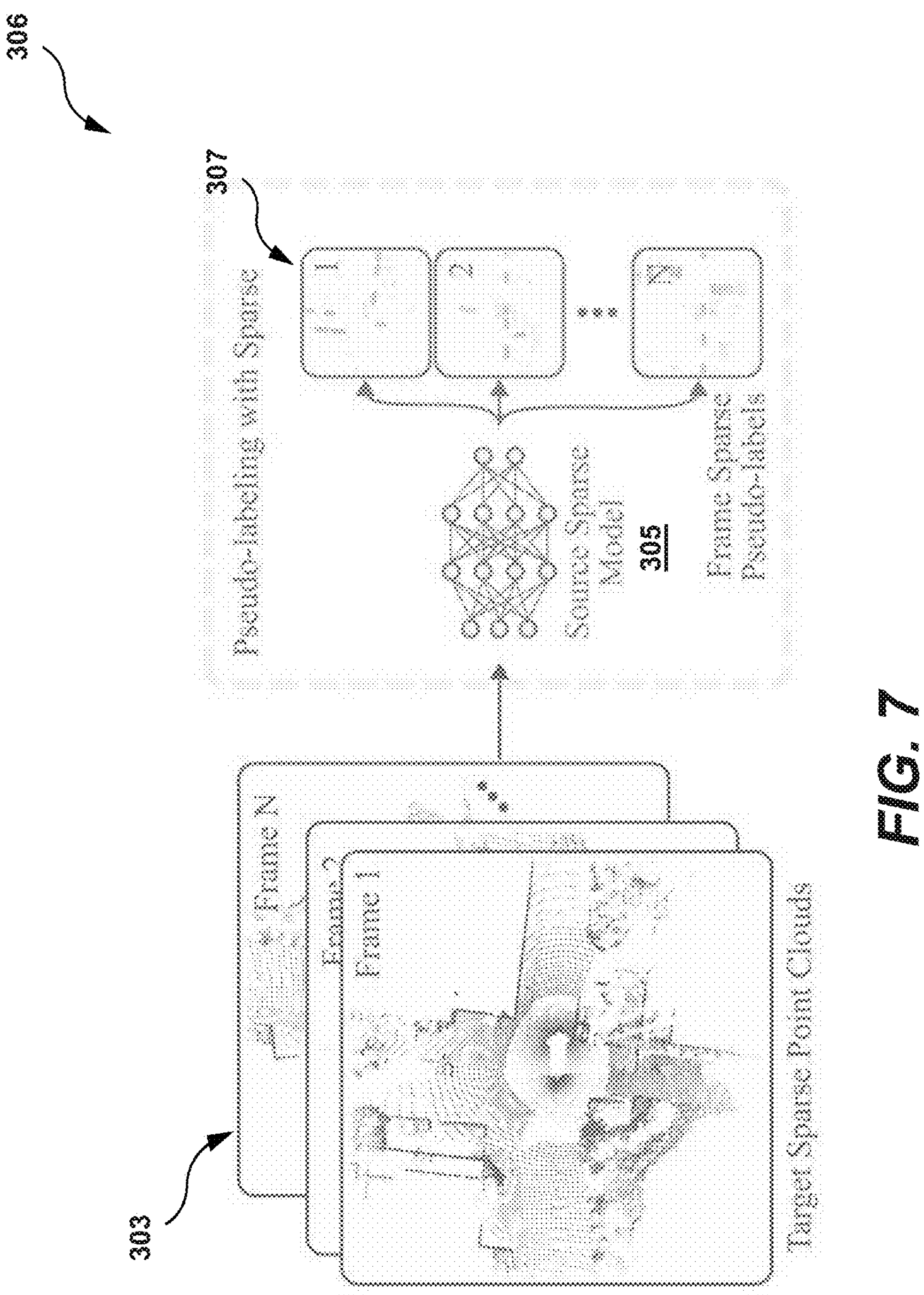
FIG. 7 depicts a schematic diagram of a sparse pseudo-label generating procedure of the pseudo-labelling pipeline of FIG. 3, in accordance with certain non-limiting embodiments of the present technology.

With reference to FIG. 7, there is depicted a schematic diagram of the sparse pseudo-label generating procedure 306, in accordance with certain non-limiting embodiments of the present technology.

According to certain non-limiting embodiments of the present technology, the sparse pseudo-label generating procedure 306 includes feeding, by the server 23, each one of the unlabelled training 3D point clouds of the unlabelled training dataset 303 of the target domain, prior to applying thereto the SA and SOAP procedures 302, 304, to the OD 305 having been trained to detect the object in the source domain. Thus, by executing the sparse pseudo-label generating procedure 306, the server 23 can be configured to determine, for each one of the unlabelled training 3D point clouds of the target domain, a respective one of the sparse pseudo-labels 307, thereby generating a plurality of sparse pseudo-labelled training 3D point clouds of the target domain.

Merging Procedure

With back reference to FIG. 3, in some non-limiting embodiments of the present technology, the sever 23 can be configured to select, for the given one of the unlabelled training 3D point clouds of the target domain, a respective one of the pseudo-labels 311 as being one of the respective SOAP pseudo-label of the SOAP pseudo-labels 309 and the respective sparse pseudo-label of the sparse pseudo-labels 307.

More specifically, in some non-limiting embodiments of the present technology, the server 23 can be configured to remove duplicates between the SOAP pseudo-labels 309 and the sparse pseudo-labels 307 by applying to the respective pseudo-labelled training 3D point clouds an overlap detection algorithm. Broadly speaking, according to certain non-limiting embodiments of the present technology, the overlap detection algorithm is configured to identify overlaps between the SOAP pseudo-labels 309 and the sparse pseudo-labels 307. In various non-limiting embodiments of the present technology, the overlap detection algorithm can comprise one of the NNS algorithm and a generalized IoU metric, as an example.

Further, in response to identifying, using the overlap detection algorithm, an overlap between a given SOAP pseudo-label and a corresponding sparse pseudo-label, that is, when both pseudo-labels are pointing out to the same training object, the server 23 can be configured to remove one of the given SOAP pseudo-label and the corresponding sparse pseudo-label. In some non-limiting embodiments of the present technology, the server 23 can be configured to remove the corresponding sparse pseudo-label; and thus determine, for the given unlabelled training 3D point cloud of the target domain, the respective one of the pseudo-labels 311 as being the respective SOAP label.

However, if the overlap detection algorithm cannot detect an overlap between the given SOAP pseudo-label and the corresponding sparse pseudo-label, in some non-limiting embodiments of the present technology, the server 23 can be configured to (i) determine a first confidence score of determining the given SOAP label, which is indicative of uncertainty thereof; (ii) determine a second confidence score of determining the corresponding spare pseudo-label; and (iii) select than one of the given SOAP pseudo-label and the corresponding sparse pseudo-label as being the respective one of the pseudo-labels 311 that is associated with a higher confidence score.

Further, the server 23 is configured to assign the so determined pseudo-labels 311 to respective ones of the unlabelled training 3D point clouds, thereby generating a sequence of pseudo-labelled training 3D point clouds of the target domain. Thus, by applying the approaches described above, mutatis mutandis, to other sequences of the unlabelled training 3D point clouds representative of other scenes, the server 23 can be configured to generate other respective sequences of pseudo-labelled 3D point clouds of the target domain that the server 23 can further add to a pseudo-labelled training dataset of the target domain.

Finally, the server 23 can be configured to use the so generated pseudo-labelled training dataset to fine-tune the OD 305 to detect the objects in the target domain, which is implemented in a similar manner to training the OD 305 to detect the objects in the source domain described above.

Experiments and Results

Certain technical effects from using the pseudo-labelling pipeline 300 for generating pseudo-labels 311 for unlabelled 3D point clouds are illustrated with experiments using an OD, such as the OD 305, of the CenterPoint architecture trained with SN augmentation. The NuScenes and Waymo datasets have been used as datasets of the source and target domains, respectively, generated by different configurations of the imaging system 18.

As indicated in Table 1 below, the present pseudo-labelling pipeline 300 can improve an average precision (AP) metric of sparse pseudo-labels by a significant margin: 13.8% higher AP for Waymo level 1 (objects with more than 5 points) and 12.3% higher AP for Waymo level 2 (all objects).

TABLE 1

Pseudo-labelling quality for the object class when the source dataset is based on NuScenes and the target dataset is based on Waymo.

| | Overall | | 0-30 m | | 30-50 m | | 50-80 m | |
|---|---|---|---|---|---|---|---|---|
| Method | Level 1 | Level 2 | Level 1 | Level 2 | Level 1 | Level 2 | Level 1 | Level 2 |
| Sparse | 33.2 | 28.8 | 63.3 | 62.2 | 19.6 | 17.4 | 3.6 | 2.7 |
| Sparse + SA | 34.9 +1.7 | 30.5 +1.7 | 63.2 0.1 | 62.4 +0.2 | 21.7 +2.1 | 19.4 +2.0 | 4.6 +1.0 | 3.4 +0.7 |
| Sparse + SA + QST | 41.2 +8.0 | 36.5 +7.7 | 66.8 +3.5 | 66.0 +3.8 | 33.2 +13.6 | 30.1 +12.7 | 13.1 +9.5 | 10.0 +7.3 |
| Sparse + SOAP (ours) | 47.0 +13.8 | 41.1 +12.3 | 70.1 +6.8 | 69.0 +6.8 | 39.8 +20.2 | 35.8 +18.4 | 19.6 +16.0 | 14.6 +11.9 |
| Target Oracle | 68.3 | 60.7 | 88.5 | 87.4 | 64.5 | 58.5 | 39.7 | 30.5 |

Figure 8:
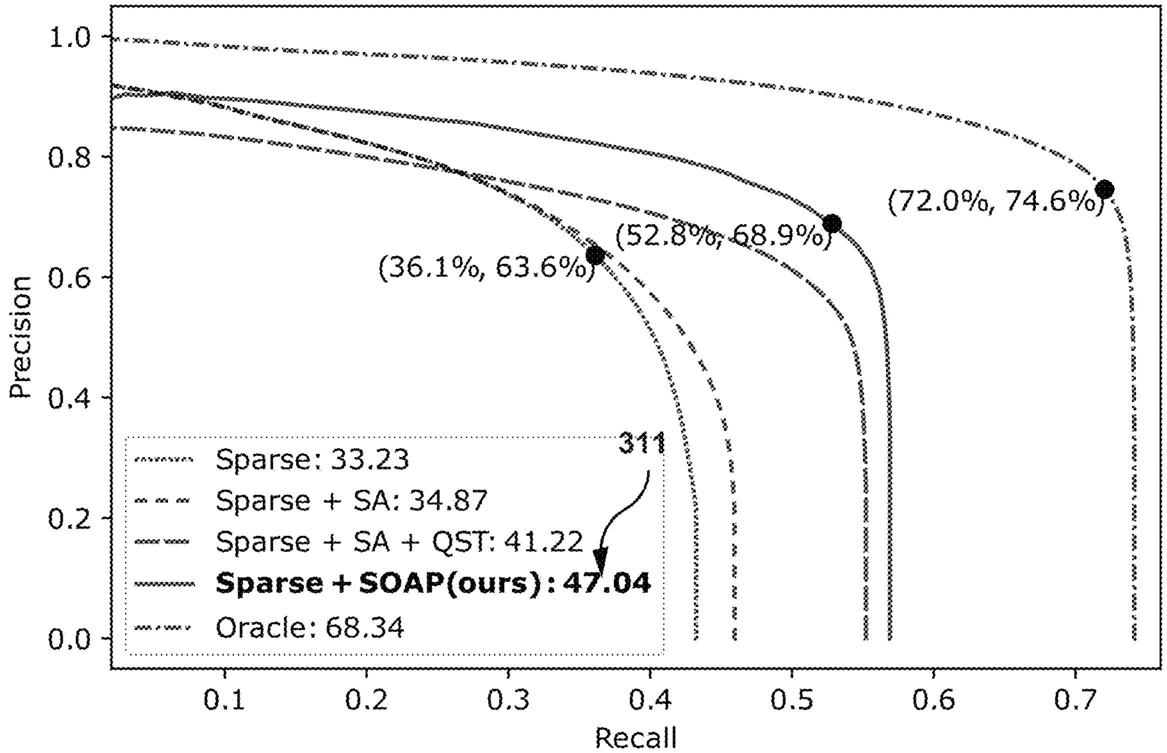
FIG. 8 depicts graphs of precision-recall curves of the pseudo-labels generated using the pseud-labelling pipe-line of FIG. 3, in accordance with certain non-limiting embodiments of the present technology.

Also, it has been shown that, at a confidence threshold of 0.5, the pseudo-labels 311 can recall over 50% of objects with almost 70% precision. Compared to the sparse baseline, the pseudo-labels 311 have 5.3% higher precision and 16.7% higher recall. FIG. 8 depicts precision-recall curves of the pseudo-labels 311 generated using the pseud-labelling OD 605 trained based on NuScenes dataset and oracle model and evaluated on Waymo Car class, in accordance with certain non-limiting embodiments of the present technology. The numbers in the legend show the AP for each method. The recall and precision for a confidence threshold of 0.5 are annotated on each of the precision-recall curves.

Further, the pseudo-labels 311 generated by the present pseudo-labelling pipeline 300 can benefit domain adaptation, improving the performance of the OD 305 on the target domain via fine-tuning. As indicated in Table 2 below, fine-tuning with SOAP pseudo-labels lead to a consistently better-performing OD in the target domain. For object class, in particular, the present technology can allow closing a domain gap between NuScenes to Waymo by 42% compared to the 19% closed by the sparse pseudo-labels.

TABLE 2

The domain adaptation results via fine-tuning with sparse and SOAP pseudo-labels.

| Source → | Target | Method | Average | | Car | | Truck | | Bus | | Motor | | Cyclist | | Ped. | |
|---|---|---|---|---|---|---|---|---|---|---|---|---|---|---|---|---|
| nuScenes → | Waymo | Sparse | 15.5 | | 33.2 | | 4.0 | | 10.8 | | 21.4 | | 5.5 | | 17.9 | |
| | | FT with Sparse | 20.4 | +12% | 39.9 | +19% | 6.7 | +9% | 19.2 | +22% | 22.2 | +2% | 10.8 | +8% | 23.7 | +12% |
| | | FT with SOAP (ours) | 24.0 | +21% | 47.8 | +42% | 6.7 | +9% | 24.6 | +36% | 27.5 | +19% | 13.0 | +12% | 24.4 | +13% |
| | | Target Oracle | 56.5 | | 68.3 | | 34.2 | | 49.0 | | 53.1 | | 68.4 | | 65.9 | |
| Waymo → | nuScenes | Sparse | 11.9 | | 45.8 | | 2.8 | | 5.2 | | 2.2 | | 0 | | 15.7 | |
| | | FT with Sparse | 13.4 | +3% | 45.8 | +0% | 4.7 | +4% | 11.5 | +11% | 3.4 | +3% | 0 | +0% | 14.8 | +2% |
| | | FT with SOAP (ours) | 16.9 | +11% | 52.4 | +18% | 10.4 | +16% | 16.8 | +20% | 5.5 | +8% | 0 | +0% | 16.3 | +1% |
| | | Target Oracle | 57.3 | | 82.4 | | 51.3 | | 62.5 | | 46 | | 29 | | 72.4 | |

Computer-Implemented Method

Figure 9:
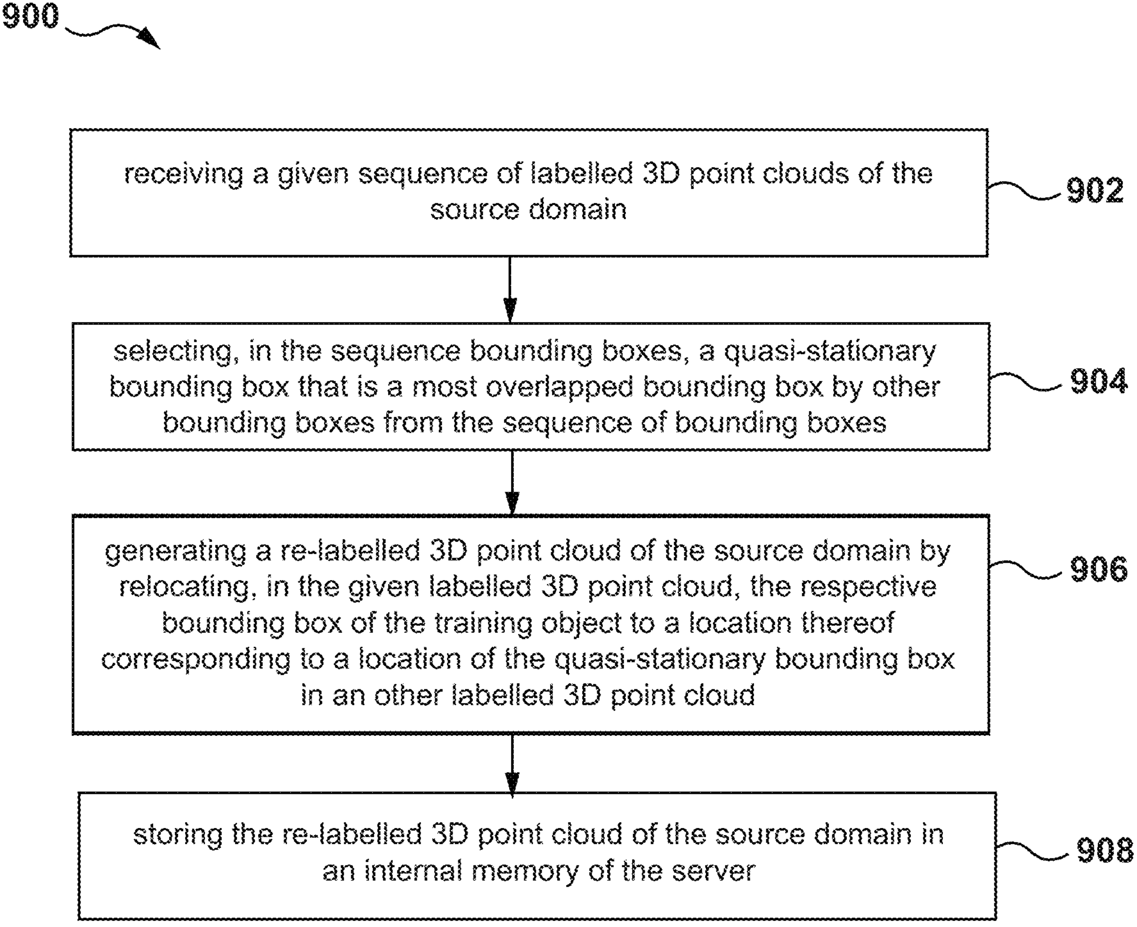
FIG. 9 depicts a flowchart diagram of a method for generating the training data for training the OD to detect the objects of FIG. 2, in accordance with certain non-limiting embodiments of the present technology.

With reference to FIG. 9, there is depicted a flowchart diagram of a method 900 for generating the pseudo-labelled training dataset for fine-tuning the OD 305 to detect the object in the target domain, in accordance with certain non-limiting embodiments of the present technology. According to certain non-limiting embodiments of the present technology, the method 900 can be executed by a processor of the server 23.

As mentioned hereinabove, the OD 305 can be preliminarily pre-trained to detect the object in the source domain.

Step 902: Receiving a Given Sequence of Labelled 3D Point Clouds of the Source Domain The method 900 commences at step 902 with the server 23 being configured to receive the labelled training dataset of the source domain including the given sequence of labelled training 3D point clouds representative of the respective scene, details of which are described above with reference to FIGS. 3 and 4.

According to certain non-limiting embodiments of the present technology, each of the given sequence of labelled training 3D point clouds has the corresponding label including the respective bounding box indicative of a respective location and/or a respective object class of the at least one training object captured by the given labelled training 3D point cloud from the sequence.

The method 900 hence advances to step 904.

Step 904: Selecting in the Sequence Bounding Boxes, a Quasi-Stationary Bounding Box that is a Most Overlapped Bounding Box by Other Bounding Boxes from the Sequence of Bounding Boxes At step 904, according to certain non-limiting embodiments of the present technology, the server 23 can be configured to determine, in the given sequence of labelled training 3D point clouds, the quasi-stationary bounding boxes (or otherwise quasi-stationary training objects labelled by these bounding boxes) that can be defined as slow-moving bounding boxes within the given sequence of labelled training 3D point clouds. To that end, in some non-limiting embodiments of the present technology, the server 23 can be configured to apply to the given sequence of labelled training 3D point clouds, the SOAP procedure 304 described above with reference to FIG. 6.

In some non-limiting embodiments of the present technology, prior to applying the SOAP procedure 304, the server 23 can be configured to apply, to the given sequence of labelled 3D point clouds, the SA procedure 302 to generate the respective source dense labelled training 3D point cloud, as described above with reference to FIG. 4 with respect to the given dense unlabelled training 3D point cloud 402. In this regard, the quasi-stationary bounding boxes can be defined as bounding boxes of training objects that have undergone minimum distortion in the respective source dense labelled training 3D point cloud. Thus, applying the SOAP procedure 304, the server 23 can be configured to determine a given quasi-stationary bounding box as being a bounding box, in the respective source dense labelled training 3D point cloud, that is a most overlapped bounding box with other bounding boxes. In some non-limiting embodiments of the present technology, the server 23 can be configured to determine the quasi-stationary bounding box as being a bounding box that is both the most overlapped with other bounding boxes and includes a number of points that is above a predetermined threshold. In other words, in these embodiments, the given quasi-stationary bounding box is a bounding box that is not only the most overlapped by the other bounding boxes but also includes a sufficient number of points (or otherwise observations) for further use in generating the re-labelled training dataset, as will be described at step 906.

The method 900 hence advances to step 906.

Step 906: Generating a Re-Labelled 3D Point Cloud of the Source Domain by Relocating, in the Given Labelled 3D Point Cloud, the Respective Bounding Box of the Training Object to a Location Thereof Corresponding to a Location of the Quasi-Stationary Bounding Box in an Other Labelled 3D Point Cloud At Step 906, According to Certain Non-Limiting Embodiments of the Present Technology, based on the so determined quasi-stationary bounding box in the given sequence of labelled 3D point clouds, the server 234 can be configured to generate the respective plurality of re-labelled training 3D point clouds of the source domain. More specifically, at this step, the server 23 can be configured to replace (or otherwise relocate), in each one of the given sequence of labelled training 3D point clouds, the respective bounding box with the quasi-stationary bounding box, as described above further above with reference to FIG. 6.

The method 900 hence advances to step 908.

Step 908: Storing the Re-Labelled 3D Point Cloud of the Source Domain in an Internal Memory of the Server At step 908, according to certain non-limiting embodiments of the present technology, the server 23 can be configured to save the respective plurality of re-labelled training 3D point clouds of the source domain in an internal memory of the server 23, such as a least one of the solid-state drive 150 and the RAM 130, for further use in generating the pseudo-labels for unlabelled training 3D point clouds of the target domain (different from the source domain), such as those of the unlabelled training dataset 303.

For example, in some non-limiting embodiments of the present technology, based on the so generated respective plurality re-labelled training 3D point clouds of the source domain, the server 23 can further be configured to train the other OD to detect the objects in the dense 3D point clouds of the source domain, thereby generating the pseudo-labelling OD 605. As mentioned hereinabove, in various non-limiting embodiments of the present technology, the other OD can be implemented similarly or differently from the OD 305.

Further, the server 23 can be configured to apply the pseudo-labelling OD 605 to the given sequence of unlabelled training 3D point clouds of the target domain to generate, for each one thereof, the corresponding pseudo-label, such as the respective one of the pseudo-labels 311.

To that end, in some non-limiting embodiments of the present technology, the server 23 can be configured to: (i) generate, by executing the SA procedure 302, the given dense unlabelled training 3D point cloud 402, as described above with reference to FIG. 4; and (ii) feed the given dense unlabelled training 3D point cloud 402, thereby determining for each one of the given sequence of unlabelled training 3D point clouds, the respective one of the SA pseudo-labels 602. By doing so, the server 23 can be configured to generate the sequence of SA pseudo-labelled training 3D point clouds.

Further, as mentioned further above with reference to FIG. 6, the server 23 can be configured to remove false positive pseudo-labels and recover false negative ones by applying, to each one of the SA pseudo-labels 602 Spatial Consistency Post-processing (SCP). In so doing, the server 23 can be configured to generate, for each one of the sequence of SA pseudo-labelled training 3D point clouds, respective ones of the SOAP pseudo-labels 309.

Further, in some non-limiting embodiments of the present technology, the server 23 can be configured to determine, for the given unlabelled training 3D point cloud of the unlabelled training dataset 303 of the target domain, the respective one of the pseudo-labels 311 as being the respective SOAP pseudo-label of the SOAP pseudo-labels 309. However, in other non-limiting embodiments of the present technology, the server 23 can be configured to compare the respective SOAP pseudo-label with the respective sparse pseudo-label of the sparse pseudo-labels 307 determined by the OD 305 via standard inference.

In this regard, according to certain non-limiting embodiments of the present technology, the server 23 can be configured to execute the sparse pseudo-label generating procedure 306 described above with reference to FIG. 7. Further, in these embodiments, the server 23 can be configured to remove duplicates between the SOAP pseudo-labels 309 and the sparse pseudo-labels 307 by applying to the respective pseudo-labelled training 3D point clouds the overlap detection algorithm, as mentioned further above.

Further, the server 23 is configured to assign the so determined pseudo-labels 311 to respective ones of the unlabelled training 3D point clouds, thereby generating a sequence of pseudo-labelled training 3D point clouds of the target domain. Thus, by applying step 908 described above, mutatis mutandis, to other sequences of the unlabelled training 3D point clouds representative of other scenes, the server 23 can be configured to generate other respective sequences of pseudo-labelled 3D point clouds of the target domain that the server 23 can further add to a pseudo-labelled training dataset of the target domain.

Finally, the server 23 can be configured to use the so generated pseudo-labelled training dataset to fine-tune the OD 305 to detect the objects, such as the given surrounding object 206 in the given 3D point cloud, in the target domain, which is implemented in a similar manner to training the OD 305 to detect the objects in the source domain described above.

The method 900 hence terminates.

Thus, certain embodiments of the method 900 may allow generating more accurate pseudo-labels for 3D point clouds of the target domain, which may increase the overall efficiency and effectiveness of the object detection.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A computer-implementable method of generating training data for fine-tuning an Object Detector (OD) to detect objects in 3D point clouds in a target domain, the OD having been trained to detect the objects in a source domain, different from the target domain, the method comprising:

receiving a given sequence of labelled 3D point clouds of the source domain, the given sequence of labelled 3D point clouds being representative of a respective scene including a training object, each labelled 3D point cloud of the given sequence of labelled 3D point clouds having been labelled with a corresponding label including a respective bounding box indicative of a location of the training object within a given labelled 3D point cloud, thereby defining a sequence of bounding boxes locating the training object in the given sequence of the labelled 3D point clouds;

selecting, in the sequence bounding boxes, a quasi-stationary bounding box that is a most overlapped bounding box by other bounding boxes from the sequence of bounding boxes;

generating a re-labelled 3D point cloud of the source domain by relocating, in the given labelled 3D point cloud, the respective bounding box of the training object to a location thereof corresponding to a location of the quasi-stationary bounding box in an other labelled 3D point cloud;

storing the re-labelled 3D point cloud of the source domain in an internal memory of the server;

wherein, prior to the selecting the quasi-stationary bounding box, the method further comprises pre-processing the given sequence of labelled 3D point clouds, by:

aggregating labelled 3D point clouds within the given sequence of labelled 3D point clouds to generate a dense labelled training 3D point cloud representative of the respective scene; and applying, to the dense labelled training 3D point cloud, a post-processing function configured for at least one of: (i) removing dynamic training objects from the dense labelled training 3D point cloud; (ii) removing a ground in the dense labelled training 3D point cloud; and (iii) voxel-grid downsampling, and removing statistical outliers; and wherein the aggregating comprises applying a simple aggregation algorithm, which comprises aggregating the given sequence of labelled 3D point clouds in accordance with equations:

$$SA' = U_{i=1,2,\ldots,N}\{T_i p_i^j\}_{j=1,2,\ldots,Mi},$$

$$SA = PS(SA'),$$

where:

$$P_i = \{p_i^1, p_i^2, \ldots, p_i^{Mi}\} \subseteq \mathbb{R}^3$$

is a plurality of points defining the given labelled 3D point cloud;

$\{T_i, T_2, \ldots, T_N\} \subseteq SE(3)$ are corresponding pose transformations that transform each labelled 3D point cloud with a respective bounding box to a common coordinate system;

$M_i = |P_i|$; and $PS$ is the post-processing function.

2. The method of claim 1, wherein the selecting comprises selecting the quasi-stationary bounding box that is the most overlapped by other bounding boxes from the sequence of bounding boxes with a number of points that is above a predetermined threshold.

3. The method of claim 1, further comprising:

generating a sequence of re-labelled 3D point clouds of the source domain by replacing, in each one of the given sequence of labelled 3D point clouds, the respective bounding box with the quasi-stationary bounding box; and storing the sequence of re-labelled 3D point clouds of the source domain in the internal memory of the server.

4. The method of claim 1, wherein the selecting the quasi-stationary bounding box from the sequence of bounding boxes comprises:

determining, for the given bounding box from the sequence of bounding boxes, a respective value of a quasi-stationary score, the respective value of the quasi-stationary score being indicative of an extent of overlap between the given bounding box and the other bounding box; and determining the quasi-stationary bounding box as being the respective bounding box in the sequence of bounding boxes associated with a highest respective value of the quasi-stationary score.

5. The method of claim 4, wherein the respective value of the quasi-stationary score is further indicative of a respective number of points in the given bounding box and the other bounding box.

6. The method of claim 4, wherein the respective value of the quasi-stationary score is determined in accordance with a formula:

$$QSS(b_i) = \sum_{j=1}^{N} \frac{C(b_j)}{\sum_{k=1}^{N} C(b_k)} IoU(b_i, b_j),$$

where $(b_i, b_j)$ are the given and other bounding boxes of the sequence of bounding boxes, respectively;

$C(b_i)$ is a number of points within the given bounding box $b_i$; and

IoU is a respective Intersection over Union value between the respective bounding boxes $(b_i, b_j)$.

7. The method of claim 4, wherein the respective value of the quasi-stationary score is indicative of an observed distance between center points of the given and other bounding boxes.

8. The method of claim 4, wherein the respective value of the quasi-stationary score is indicative of an observed movement velocity of the training object in the given and other bounding boxes.

9. The method of claim 1, further comprising training, using the re-labelled 3D point cloud, an other OD to detect the object in the source domain, thereby generating a pseudo-labelling OD.

10. The method of claim 9, prior to the training, the method further comprises:

aggregating a sequence of re-labelled 3D point clouds representative of the respective scene to generate a dense re-labelled 3D point cloud; and training, using the dense re-labelled 3D point cloud, the other OD to detect the object in the source domain, thereby generating the pseudo-labelling OD.

11. The method of claim 9, further comprising:

receiving a plurality of unlabelled 3D point clouds of the target domain, each one of the plurality of unlabelled 3D point clouds being devoid of the corresponding label;

feeding each one of the plurality of unlabelled 3D point clouds to the pseudo-labelling OD to generate, for each one of the plurality of unlabelled 3D point clouds, a corresponding pseudo-label, thereby generating a plurality of pseudo-labelled 3D point clouds of the target domain; and storing the plurality of pseudo-labelled 3D point clouds in the internal memory of the server.

12. The method of claim 11, wherein prior to the feeding, the method further comprises:

aggregating sequences of unlabelled 3D point clouds representative of the respective scenes to generate respective dense unlabelled training 3D point clouds representative of the respective scene; and feeding each respective dense unlabelled training 3D point clouds to the pseud-labelling OD.

13. The method of claim 11, wherein, prior to the storing the plurality of pseudo-labelled 3D point clouds, the method further comprises:

causing the pseudo-labelling OD to generate, for each one of the corresponding pseudo-labels, a respective pseudo-label confidence score indicative of uncertainty of a given corresponding pseudo-label;

feeding each one of the plurality of unlabelled 3D point clouds to the OD to generate:

a corresponding sparse pseudo-label for each one of the plurality of unlabelled 3D point clouds; and a respective sparse pseudo-label confidence score indicative of accuracy of a given corresponding sparse pseudo-label; and in response to an overlap between the given corresponding pseudo-label and the given corresponding sparse pseudo-label, selecting, for the generating the plurality of pseudo-labelled 3D point clouds, that one of the given corresponding and corresponding sparse pseudo-labels, which is associated with a higher one of the respective pseudo-label and respective sparse pseudo-label confidence scores.

14. The method of claim 9, further comprising:

applying, to each one of the plurality of pseudo-labelled 3D point clouds, a spatial consistency processing algorithm, including:

transforming the respective bounding boxes of corresponding pseudo-labels to a common coordinate system;

clustering in the common coordinate system, the respective bounding boxes based on an Intersection over Union threshold;

filtering each of the cluster the clusters based on a predetermined number of bounding boxes in a given cluster, the filtering including determining, for each cluster having less than the predetermined number of bounding boxes, a respective single bounding box; and applying, to the clustered and filtered respective bounding boxes of the dense pseudo-labelled training 3D point cloud, an inverse transformation to local coordinate systems thereof in respective ones of the plurality of pseudo-labelled 3D point clouds, thereby generating updated corresponding pseudo-labels.

15. The method of claim 14, wherein the transforming the respective bounding boxes to the common coordinate system is in accordance with an equation:

$$B_{SA} = \bigcup T_i B_{SA}^i,$$

where $$B_{SA}^i$$

is a given bounding box of a respective one of the plurality of pseudo-labelled 3D point clouds.

16. The method of claim 14, the applying, to the clustered and filtered respective bounding boxes, the inverse transformation to local coordinate systems thereof is in accordance with an equation:

$$B_{SCP}^i = T_i^{-1} B_{SCP},$$

where $B_{SCP}$ is a given clustered and filtered respective bounding box;

$$B_{SCP}^i$$

is the respective bounding box of a given updated corresponding label associated with the respective one of the plurality of pseudo-labelled 3D point clouds; and $$T_i^{-1}$$

is a corresponding pose transformation associated with the respective bounding box in the respective one of the plurality of pseudo-labelled 3D point clouds.

17. The method of claim 1, further comprising fine-tuning using the plurality of pseudo-labelled 3D point clouds, the OD to detect the objects in the target domain.

18. A system for generating training data for fine-tuning an Object Detector (OD) to detect objects in 3D point clouds in a target domain, the OD having been trained to detect the objects in a source domain, different from the target domain, the system comprising: at least one processor, and at least one memory comprising executable instructions that, when executed by the at least one processor, cause the system to:

receive a given sequence of labelled 3D point clouds of the source domain, the given sequence of labelled 3D point clouds being representative of a respective scene including a training object, each labelled 3D point cloud of the given sequence of labelled 3D point clouds having been labelled with a corresponding label including a respective bounding box indicative of a location of the training object within a given labelled 3D point cloud, thereby defining a sequence of bounding boxes locating the training object in the given sequence of the labelled 3D point clouds;

select, in the sequence bounding boxes, a quasi-stationary bounding box that is a most overlapped bounding box by other bounding boxes from the sequence of bounding boxes;

generate a re-labelled 3D point cloud of the source domain by relocating, in the given labelled 3D point cloud, the respective bounding box of the training object to a location thereof corresponding to a location of the quasi-stationary bounding box in an other labelled 3D point cloud;

store the re-labelled 3D point cloud of the source domain in the at least one memory of the system;

wherein, prior to the selecting the quasi-stationary bounding box, the method further comprises pre-processing the given sequence of labelled 3D point clouds, by:

aggregating labelled 3D point clouds within the given sequence of labelled 3D point clouds to generate a dense labelled training 3D point cloud representative of the respective scene; and applying, to the dense labelled training 3D point cloud, a post-processing function configured for at least one of: (i) removing dynamic training objects from the dense labelled training 3D point cloud; (ii) removing a ground in the dense labelled training 3D point cloud; and (iii) voxel-grid downsampling, and removing statistical outliers; and wherein the aggregating comprises applying a simple aggregation algorithm, which comprises aggregating the given sequence of labelled 3D point clouds in accordance with equations:

$$SA' = \bigcup_{i=1,2,\ldots,N} \{T_i p_i^j\}_{j=1,2,\ldots,M_i},$$

$$SA = PS(SA'),$$

where:

$$P_i = \{p_i^1, p_i^2, \ldots, p_i^{M_i}\} \subseteq \mathbb{R}^3$$

is a plurality of points defining the given labelled 3D point cloud;

$\{T_i, T_2, \ldots, T_N\} \subseteq SE(3)$ are corresponding pose transformations that transform each labelled 3D point cloud with a respective bounding box to a common coordinate system;

$$M_i = |P_i|; \text{ and}$$

$PS$ is the post-processing function.

* * * * *